United States Patent
Cha et al.

(10) Patent No.: US 12,302,277 B2
(45) Date of Patent: May 13, 2025

(54) METHOD FOR POSITIONING IN WIRELESS COMMUNICATION SYSTEM, AND DEVICE FOR SUPPORTING SAME

(71) Applicant: LG Electronics Inc., Seoul (KR)

(72) Inventors: Hyunsu Cha, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 466 days.

(21) Appl. No.: 17/431,046

(22) PCT Filed: Feb. 14, 2020

(86) PCT No.: PCT/KR2020/002152
§ 371 (c)(1),
(2) Date: Aug. 13, 2021

(87) PCT Pub. No.: WO2020/167057
PCT Pub. Date: Aug. 20, 2020

(65) Prior Publication Data
US 2022/0124664 A1  Apr. 21, 2022

Related U.S. Application Data

(60) Provisional application No. 62/806,720, filed on Feb. 15, 2019.

(51) Int. Cl.
*H04W 64/00* (2009.01)
*H04L 5/00* (2006.01)
*H04W 24/10* (2009.01)

(52) U.S. Cl.
CPC .......... *H04W 64/00* (2013.01); *H04L 5/0048* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 2012/0027110 A1 | 2/2012 | Han et al. | |
| 2013/0122930 A1 | 5/2013 | Woo et al. | |
| 2013/0176883 A1 | 7/2013 | Han et al. | |
| 2014/0057664 A1* | 2/2014 | Pei | G01S 5/0236 |
| | | | 455/456.5 |
| 2016/0205499 A1 | 7/2016 | Davydov et al. | |
| 2017/0214508 A1* | 7/2017 | Lee | H04L 5/0035 |

(Continued)

FOREIGN PATENT DOCUMENTS

| | | | |
|---|---|---|---|
| CN | 107431678 A | * 12/2017 | G01S 5/10 |
| JP | 2013511233 | 3/2013 | |

(Continued)

OTHER PUBLICATIONS

Huawei & HiSilicon, "Downlink based solutions for NR positioning," R1-1900036, Presented at 3GPP TSG RAN WG1 Ad-Hoc Meeting 1901, Taipei, Jan. 21-25, 2019, 7 pages.

(Continued)

*Primary Examiner* — Jinsong Hu
*Assistant Examiner* — Alexander J Yi
(74) *Attorney, Agent, or Firm* — Fish & Richardson P.C.

(57) ABSTRACT

Disclosed in various embodiments of the present disclosure are a method for positioning in a wireless communication system, and a device for supporting same.

8 Claims, 15 Drawing Sheets

(56) References Cited

U.S. PATENT DOCUMENTS

| | | |
|---|---|---|
| 2017/0366244 A1 | 12/2017 | Lee et al. |
| 2018/0049149 A1 | 2/2018 | Lee et al. |
| 2018/0054699 A1 | 2/2018 | Edge et al. |
| 2018/0098187 A1 | 4/2018 | Blankenship et al. |
| 2018/0262868 A1 | 9/2018 | Edge |
| 2018/0270784 A1 | 9/2018 | Lee et al. |
| 2019/0045477 A1 | 2/2019 | Edge |

FOREIGN PATENT DOCUMENTS

| | | |
|---|---|---|
| KR | 20130052674 | 5/2013 |
| KR | 20160057336 | 5/2016 |
| KR | 20170049494 | 5/2017 |
| WO | WO2016163943 | 10/2016 |
| WO | WO2017026672 | 2/2017 |
| WO | WO2018069208 | 4/2018 |
| WO | WO2018148748 | 8/2018 |
| WO | WO2019027595 | 2/2019 |

OTHER PUBLICATIONS

LG Electronics, "Discussions on DL only based Positioning," R1-1900629, Presented at 3GPP TSG RAN WG1 Ad-Hoc Meeting 1901, Taipei, Taiwan, Jan. 21-25, 2019, 9 pages.

Notice of Allowance in Korean Appln. No. 10-2020-0018635, dated Aug. 26, 2020, 5 pages (with English translation).

Vivo, "Views on NR downlink positioning techniques," R1-1900149, Presented at 3GPP TSG RAN WG1 Ad-Hoc Meeting 1901, Taipei, Jan. 21-25, 2019, 6 pages.

Extended European Search Report in European Appln. No. 20756592.0, dated Feb. 16, 2022, 10 pages.

Notice of Allowance in Korean Appln. No. 10-2020-0160403, dated Mar. 29, 2022, 5 pages (with English translation).

Notice of Publication of Registration in Chinese Appln. No. 202080028550.8, mailed on Mar. 1, 2024, 73 pages (with English Abstract).

* cited by examiner

METHOD FOR POSITIONING IN WIRELESS COMMUNICATION SYSTEM, AND DEVICE FOR SUPPORTING SAME

CROSS-REFERENCE TO RELATED APPLICATIONS

This application is a National Stage application under 35 U.S.C. § 371 of International Application No. PCT/KR2020/002152, filed on Feb. 14, 2020, which claims the benefit of U.S. Provisional Application No. 62/806,720, filed on Feb. 15, 2019. The disclosures of the prior applications are incorporated by reference in their entirety.

TECHNICAL FIELD

Various embodiments of the present disclosure relate to a wireless communication system, and more particularly, to a positioning method in a wireless communication system and apparatus for supporting the same.

BACKGROUND

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, ultra-reliable and low latency communication (URLLC), and the like has been discussed.

SUMMARY

Various embodiments of the present disclosure may provide a method and apparatus for transmitting and receiving a signal in a wireless communication system.

Specifically, various embodiments of the present disclosure may provide a positioning method in a wireless communication system and apparatus for supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Various embodiments of the present disclosure may provide a positioning method in a wireless communication system and apparatus for supporting the same.

According to various embodiments of the present disclosure, a method for a user equipment (UE) in a wireless communication system may be provided.

In an exemplary embodiment, the method may include: receiving reference configuration information related to a reference timing; receiving a plurality of positioning reference signals (PRSs); obtaining at least one reference signal time difference (RSTD) based on the reference timing and at least one PRS among the plurality of PRSs; and transmitting information related to the at least one RSTD.

In an exemplary embodiment, the plurality of PRSs may be received from a plurality of transmission and reception points (TRPs).

In an exemplary embodiment, based on that the reference configuration information includes at least one of: (i) information on a reference TRP among the plurality of TRPs; (ii) information on a reference PRS resource; or (iii) information on a PRS resource set including the reference PRS resource, the reference timing may be obtained based on the at least one piece of information.

In an exemplary embodiment, based on that the at least one RSTD is obtained based on a PRS resource different from the reference PRS resource among predetermined PRS resources or the at least one RSTD is obtained based on a PRS resource set different from the PRS resource set among predetermined PRS resource sets, the information related to the at least one RSTD may include at least one of: information on the different PRS resource; or information on the different PRS resource set.

In an exemplary embodiment, the method may further include receiving information on whether at least one of the following: (i) obtaining the at least one RSTD based on the different PRS resource; or (ii) obtaining the at least one RSTD based on the different PRS resource set is allowed.

In an exemplary embodiment, the different PRS resource and the different PRS resource sets may be selected from among the predetermined PRS resources and the predetermined PRS resource sets, respectively, based on quality of a time of arrival (ToA) or a propagation time.

In an exemplary embodiment, each of a plurality of PRS resources allocated to each of the plurality of TRPs may be related to a different transmission beam.

In an exemplary embodiment, based on that the reference configuration information does not include; (i) the information on the reference TRP; (ii) the information on the reference PRS resource; and (iii) the information on the PRS resource set including the reference PRS resource, the reference timing may be obtained based on at least one of: a specific PRS resource configured by the UE; or a specific PRS resource set configured by the UE.

According to various embodiments of the present disclosure, an apparatus configured to operate in a wireless communication system may be provided.

In an exemplary embodiment, the apparatus may include: a memory; and at least one processor connected to the memory.

In an exemplary embodiment, the at least one processor may be configured to: receive reference configuration information related to a reference timing; receive a plurality of PRSs; obtain at least one RSTD based on the reference timing and at least one PRS among the plurality of PRSs; and transmit information related to the at least one RSTD.

In an exemplary embodiment, the plurality of PRSs may be received from a plurality of TRPs.

In an exemplary embodiment, based on that the reference configuration information includes at least one of: (i) information on a reference TRP among the plurality of TRPs; (ii) information on a reference PRS resource; or (iii) information on a PRS resource set including the reference PRS resource, the reference timing may be obtained based on the at least one piece of information.

In an exemplary embodiment, based on that the at least one RSTD is obtained based on a PRS resource different from the reference PRS resource among predetermined PRS resources or the at least one RSTD is obtained based on a PRS resource set different from the PRS resource set among predetermined PRS resource sets, the information related to the at least one RSTD may include at least one of: information on the different PRS resource; or information on the different PRS resource set.

In an exemplary embodiment, the at least one processor may be configured to: receive information on whether at least one of the following: (i) obtaining the at least one RSTD based on the different PRS resource; or (ii) obtaining the at least one RSTD based on the different PRS resource set is allowed.

In an exemplary embodiment, the different PRS resource and the different PRS resource sets may be selected from among the predetermined PRS resources and the predetermined PRS resource sets, respectively, based on quality of a ToA or a propagation time.

In an exemplary embodiment, each of a plurality of PRS resources allocated to each of the plurality of TRPs may be related to a different transmission beam.

In an exemplary embodiment, based on that the reference configuration information does not include; (i) the information on the reference TRP; (ii) the information on the reference PRS resource; and (iii) the information on the PRS resource set including the reference PRS resource, the reference timing may be obtained based on at least one of: a specific PRS resource configured by the UE; or a specific PRS resource set configured by the UE.

In an exemplary embodiment, the apparatus may be configured to communicate with at least one of a mobile terminal, a network, or an autonomous driving vehicle other than a vehicle including the apparatus.

According to various embodiments of the present disclosure, an apparatus configured to operate in a wireless communication system may be provided.

In an exemplary embodiment, the apparatus may include: at least one processor; and at least one memory configured to store at least one instruction that causes the at least one processor to perform a method.

In an exemplary embodiment, the method may include: receiving reference configuration information related to a reference timing; receiving a plurality of PRSs; obtaining at least one RSTD based on the reference timing and at least one PRS among the plurality of PRSs; and transmitting information related to the at least one RSTD.

In an exemplary embodiment, the plurality of PRSs may be received from a plurality of TRPs.

In an exemplary embodiment, based on that the reference configuration information includes at least one of: (i) information on a reference TRP among the plurality of TRPs; (ii) information on a reference PRS resource; or (iii) information on a PRS resource set including the reference PRS resource, the reference timing may be obtained based on the at least one piece of information.

According to various embodiments of the present disclosure, a processor-readable medium configured to store at least one instruction that causes at least one processor to perform a method may be provided.

In an exemplary embodiment, the method may include: receiving reference configuration information related to a reference timing; receiving a plurality of PRSs; obtaining at least one RSTD based on the reference timing and at least one PRS among the plurality of PRSs; and transmitting information related to the at least one RSTD.

In an exemplary embodiment, the plurality of PRSs may be received from a plurality of TRPs.

In an exemplary embodiment, based on that the reference configuration information does not include; (i) the information on the reference TRP; (ii) the information on the reference PRS resource; and (iii) the information on the PRS resource set including the reference PRS resource, the reference timing may be obtained based on at least one of: a specific PRS resource configured by the UE; or a specific PRS resource set configured by the UE.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

According to various embodiments of the present disclosure, the following effects may be achieved.

According to various embodiments of the present disclosure, a positioning method in a wireless communication system and an apparatus for supporting the same may be provided.

According to various embodiments of the present disclosure, a positioning method for accurately measuring the location of a user equipment (UE) in an environment where the location of the UE is measured based on multiple beams and apparatus for supporting the same may be provided.

According to various embodiments of the present disclosure, a positioning method for accurately measuring the location of a UE in a new radio (NR) wireless communication system using narrow beams by including beam information (e.g., positioning reference signal (PRS) resource information and/or PRS resource set information) in reference configuration information for observed time difference of arrival (OTDOA) and apparatus for supporting the same may be provided.

According to various embodiments of the present disclosure, a positioning method by which a UE measures a reference signal time difference (RSTD) by selecting a PRS resource and/or PRS resource set suitable for the UE and reports information on the selected PRS resource and/or PRS resource set in order to accurately measure the location of the UE and apparatus for supporting the same may be provided.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
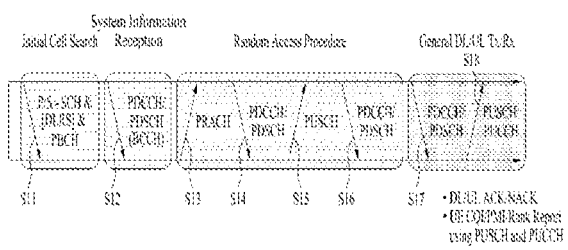
FIG. 1 is a diagram illustrating physical channels and a signal transmission method using the physical channels, which may be used in various embodiments of the present disclosure.

The various embodiments of the present disclosure described below are combinations of elements and features of the various embodiments of the present disclosure in specific forms. The elements or features may be considered selective unless otherwise mentioned. Each element or feature may be practiced without being combined with other elements or features. Further, various embodiments of the present disclosure may be constructed by combining parts of the elements and/or features. Operation orders described in various embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the various embodiments of the present disclosure will be avoided lest it should obscure the subject matter of the various embodiments of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the various embodiments of the present disclosure (more particularly, in the context of the following claims) unless indicated otherwise in the specification or unless context clearly indicates otherwise.

In the various embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an advanced base station (ABS), an access point, etc.

In the various embodiments of the present disclosure, the term terminal may be replaced with a UE, a mobile station (MS), a subscriber station (SS), a mobile subscriber station (MSS), a mobile terminal, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

Various embodiments of the present disclosure may be supported by standard documents disclosed in at least one of wireless access systems including an IEEE 802.xx system, a 3rd generation partnership project (3GPP) system, a 3GPP LTE system, a 3GPP 5G NR system, and a 3GPP2 system. Particularly, various embodiments of the present disclosure may be supported by technical specifications, 3GPP TS 36.211, 3GPP TS 36.212, 3GPP TS 36.213, 3GPP TS 36.321, 3GPP TS 36.331, 3GPP TS 37.213, 3GPP TS 38.211, 3GPP TS 38.212, 3GPP TS 38.213, 3GPP TS 38.321, and 3GPP TS 38.331. That is, the above documents may be referred to for obvious steps or parts which are not described in various embodiments of the present disclosure. Further, all terms used herein may be described by the standard documents.

Reference will now be made in detail to the various embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the various embodiments of the present disclosure. However, it will be apparent to those skilled in the art that the specific terms may be replaced with other terms without departing the technical spirit and scope of the various embodiments of the present disclosure.

Hereinafter, 3GPP LTE/LTE-A systems and 3GPP NR system are explained, which are examples of wireless access systems.

The various embodiments of the present disclosure can be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc.

CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as IEEE 802.11 (Wi-Fi), IEEE 802.16 (WiMAX), IEEE 802.20, evolved UTRA (E-UTRA), etc.

UTRA is a part of universal mobile telecommunications system (UMTS). 3GPP LTE is a part of evolved UMTS (E-UMTS) using E-UTRA, adopting OFDMA for DL and SC-FDMA for UL. LTE-advanced (LTE-A) is an evolution of 3GPP LTE.

While the various embodiments of the present disclosure are described in the context of 3GPP LTE/LTE-A systems and 3GPP NR system in order to clarify the technical features of the various embodiments of the present disclosure, the various embodiments of the present disclosure is also applicable to an IEEE 802.16e/m system, etc.

1. OVERVIEW OF 3GPP SYSTEM 1.1. Physical Channels and General Signal Transmission In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

FIG. 1 is a diagram illustrating physical channels and a signal transmission method using the physical channels, which may be used in various embodiments of the present disclosure.

When a UE is powered on or enters a new cell, the UE performs initial cell search (S11). The initial cell search involves acquisition of synchronization to a BS. Specifically, the UE synchronizes its timing to the base station and acquires information such as a cell identifier (ID) by receiving a primary synchronization channel (P-SCH) and a secondary synchronization channel (S-SCH) from the BS.

Then the UE may acquire information broadcast in the cell by receiving a physical broadcast channel (PBCH) from the base station.

During the initial cell search, the UE may monitor a DL channel state by receiving a downlink reference signal (DL RS).

After the initial cell search, the UE may acquire more detailed system information by receiving a physical downlink control channel (PDCCH) and receiving on a physical downlink shared channel (PDSCH) based on information of the PDCCH (S12).

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

When the random access procedure is performed in two steps, steps S13 and S15 may be performed in one operation for a UE transmission, and steps S14 and S16 may be performed in one operation for a BS transmission.

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2:
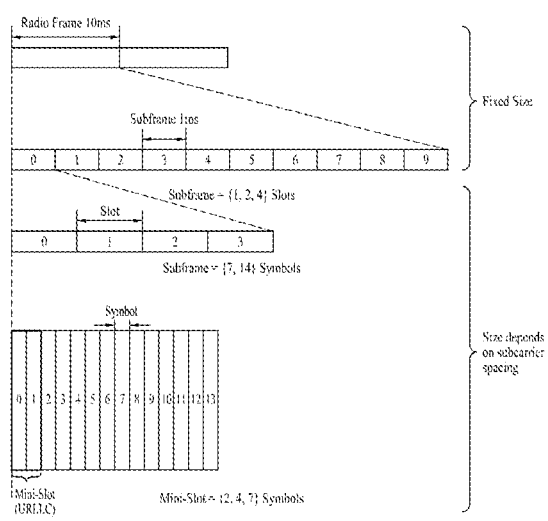
FIG. 2 is a diagram illustrating a radio frame structure in a new radio access technology (NR) system to which various embodiments of the present disclosure are applicable.

FIG. 2 is a diagram illustrating a radio frame structure in an NR system to which various embodiments of the present disclosure are applicable.

The NR system may support multiple numerologies. A numerology may be defined by a subcarrier spacing (SCS) and a cyclic prefix (CP) overhead. Multiple SCSs may be derived by scaling a default SCS by an integer N (or $\mu$). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part, $\mu$ and a CP are obtained from RRC parameters provided by the BS.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c=1/(\Delta f_{max}*N_f)$ where $\Delta f_{max}=480*10^3$ Hz and a value $N_f$ related to a fast Fourier transform (FFT) size or an inverse fast Fourier transform (IFFT) size is given as $N_f=4096$. $T_c$ and $T_s$ which is an LTE-based time unit and sampling time, given as $T_s=1/((15 \text{ kHz})*2048)$ are placed in the following relationship: $T_s/T_c=64$. DL and UL transmissions are organized into (radio) frames each having a duration of $T_f=(\Delta f_{max}*N_f/100)*T_c=10$ ms. Each radio frame includes 10 subframes each having a duration of $T_{sf}=(\Delta f_{max}*N_f/1000)*T_c=1$ ms. There may exist one set of frames for UL and one set of frames for DL. For a numerology $\mu$, slots are numbered with $n^\mu_s \in \{0, \ldots, N^{slot,\mu}_{subframe}-1\}$ in an increasing order in a subframe, and with $n^\mu_{s,f} \in \{0, \ldots, N^{slot,\mu}_{frame}-1\}$ in an increasing order in a radio frame. One slot includes $N^\mu_{symb}$ consecutive OFDM symbols, and $N^\mu_{symb}$ depends on a CP. The start of a slot $n^\mu_s$ in a subframe is aligned in time with the start of an OFDM symbol $n^\mu_s*N^\mu_{symb}$ in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which various embodiments of the present disclosure are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with $\mu=2$ (i.e., an SCS of 60 kHz), in which referring to Table 3, one subframe may include four slots. One subframe={1, 2, 4} slots in FIG. 2, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

Figure 3:
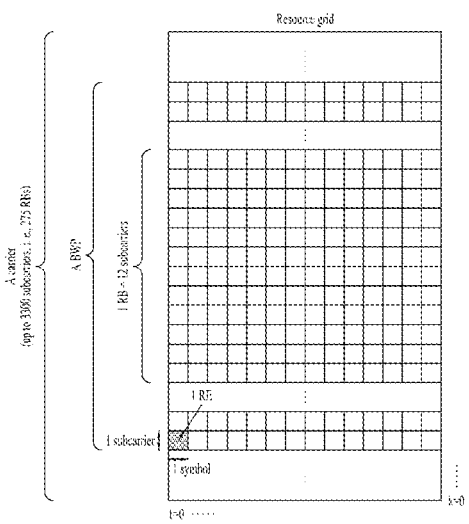
FIG. 3 is a diagram illustrating a slot structure in an NR system to which various embodiments of the present disclosure are applicable.

FIG. 3 is a diagram illustrating a slot structure in an NR system to which various embodiments of the present disclosure are applicable.

Referring FIG. 3, one slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 4:
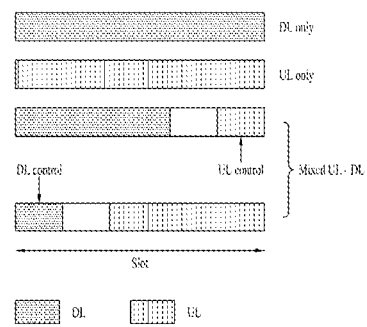
FIG. 4 is a diagram illustrating a self-contained slot structure to which various embodiments of the present disclosure are applicable.

FIG. 4 is a diagram illustrating a self-contained slot structure to which various embodiments of the present disclosure are applicable.

The self-contained slot structure may refer to a slot structure in which all of a DL control channel, DL/UL data, and a UL control channel may be included in one slot.

In FIG. 4, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, a BS and a UE may sequentially perform DL transmission and UL transmission in one slot. That is, the BS and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the BS and the UE to switch from transmission mode to reception mode and vice versa. To this end, in the self-contained slot structure, some OFDM symbols at the time of switching from DL to UL may be configured as a guard period (GP).

Figure 12:
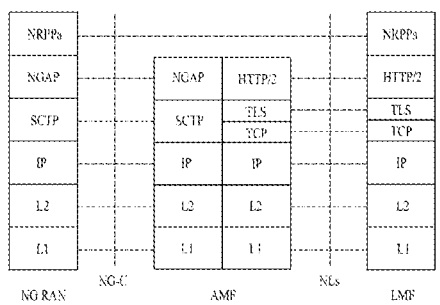
FIG. 12 is a diagram illustrating protocol layers for supporting NR positioning protocol a (NRPPa) protocol data unit (PDU) transmission, to which various embodiments are applicable.
Figure 13:
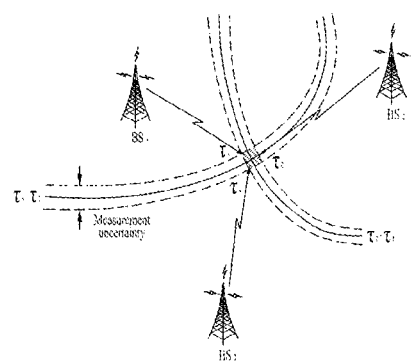
FIG. 13 is a diagram illustrating an observed time difference of arrival (OTDOA) positioning method, to which various embodiments are applicable.

While the self-contained slot structure has been described above as including both of a DL control region and a UL control region, the control regions may selectively be included in the self-contained slot structure. In other words, the self-contained slot structure according to various embodiments of the present disclosure may cover a case of including only the DL control region or the UL control region as well as a case of including both of the DL control region and the UL control region, as illustrated in FIG. 12.

Further, the sequence of the regions included in one slot may vary according to embodiments. For example, one slot may include the DL control region, the DL data region, the UL control region, and the UL data region in this order, or the UL control region, the UL data region, the DL control region, and the DL data region in this order.

A PDCCH may be transmitted in the DL control region, and a PDSCH may be transmitted in the DL data region. A PUCCH may be transmitted in the UL control region, and a PUSCH may be transmitted in the UL data region.

1.3. Channel Structures 1.3.1. DL Channel Structures

The BS transmits related signals to the UE on DL channels as described below, and the UE receives the related signals from the BS on the DL channels.

1.3.1.1. Physical Downlink Shared Channel (PDSCH)

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

1.3.1.2. Physical Downlink Control Channel (PDCCH)

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

For each CORESET, a precoder granularity in the frequency domain is set to one of the followings by higher-layer signaling:
- sameAsREG-bundle: It equals to an REG bundle size in the frequency domain.
- allContiguousRBs: It equals to the number of contiguous RBs in the frequency domain within the CORESET.

The REGs of the CORESET are numbered in a time-first mapping manner. That is, the REGs are sequentially numbered in an increasing order, starting with 0 for the first OFDM symbol of the lowest-numbered RB in the CORESET.

CCE-to-REG mapping for the CORESET may be an interleaved type or a non-interleaved type.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters:
- controlResourceSetId: A set of control resources related to the search space set.
- monitoringSlotPeriodicityAndOffset: A PDCCH monitoring periodicity (in slots) and a PDCCH monitoring offset (in slots).
- monitoringSymbolsWithinSlot: A PDCCH monitoring pattern (e.g., the first symbol(s) in the CORESET) in a PDCCH monitoring slot.
- nrofCandidates: The number of PDCCH candidates for each AL={1, 2, 4, 8, 16} (one of 0, 1, 2, 3, 4, 5, 6, and 8).

Table 5 lists exemplary features of the respective search space types.

TABLE 5

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 6 lists exemplary DCI formats transmitted on the PDCCH.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to the UE, and DCI format 2_1 is used to deliver DL preemption information to the UE. DCI format 2_0 and/or DCI format 2_1 may be delivered to the UEs of a group on a group common PDCCH (GC-PDCCH) which is a PDCCH directed to a group of UEs.

1.3.2. UL Channel Structures

The UE transmits related signals on later-described UL channels to the BS, and the BS receives the related signals on the UL channels from the UE.

1.3.2.1. Physical Uplink Shared Channel (PUSCH)

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

1.3.2.2. Physical Uplink Control Channel (PUCCH)

The PUCCH delivers UCI, an HARQ-ACK, and/or an SR and is classified as a short PUCCH or a long PUCCH according to the transmission duration of the PUCCH. Table 7 lists exemplary PUCCH formats.

TABLE 7

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

1.4. Cell Search

Figure 5:
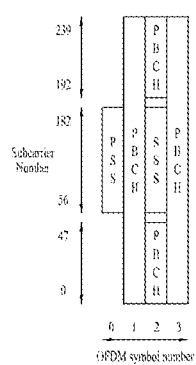
FIG. 5 is a diagram illustrating a synchronization signal block (SSB) structure to which various embodiments of the present disclosure are applicable.

FIG. 5 is a diagram illustrating a synchronization signal block (SSB) structure to which various embodiments of the present disclosure are applicable.

The UE may perform cell search, system information acquisition, beam alignment for initial access, DL measurement, and so on based on an SSB.

Referring to FIG. 5, the SSB includes a PSS, an SSS, and a PBCH. The SSB includes four consecutive OFDM symbols, and the PSS, the PBCH, the SSS/PBCH, and the PBCH are transmitted in the respective OFDM symbols. Each of the PSS and the SSS includes one OFDM symbol by 127 subcarriers, and the PBCH includes three OFDM symbols by 576 subcarriers. Polar coding and QPSK are applied to the PBCH. The PBCH includes data REs and demodulation reference signal (DMRS) REs in every OFDM symbol. There are three DMRS REs per RB, with three data REs between every two adjacent DMRS REs.

Cell search is a process of acquiring time/frequency synchronization with a cell and detecting the identifier (ID) (e.g., physical cell ID (PCID)) of the cell. The PSS is used to detect a cell ID in a cell ID group, and the SSS is used to detect the cell ID group. The PBCH is used to detect an SSB (time) index and a half-frame.

The cell search process of the UE may be summarized in Table 8.

TABLE 8

| | Type of Signals | Operations |
|---|---|---|
| 1st step | PSS | * SS/PBCH block (SSB) symbol timing acquisition<br>* Cell ID detection within a cell ID group (3 hypothesis) |
| 2nd Step | SSS | * Cell ID group detection (336 hypothesis) |
| 3rd Step | PBCH DMRS | * SSB index and Half frame (HF) index (Slot and frame boundary detection) |
| 4th Step | PBCH | * Time information (80 ms, System Frame Number (SFN), SSB index, HF)<br>* Remaining Minimum System Information (RMSI) Control resource set (CORESET)/Search space configuration |
| 5th Step | PDCCH and PDSCH | * Cell access information<br>* RACH configuration |

There may be 336 cell ID groups, each including three cell IDs. There may be 1008 cell IDs in total. Information about a cell ID group to which the cell ID of a cell belongs may be provided/obtained through the SSS of the cell, and information about the cell ID among 336 cells in the cell ID may be provided/obtained through the PSS.

Figure 6:
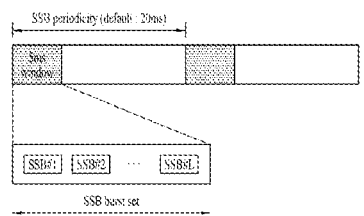
FIG. 6 is a diagram illustrating an exemplary SSB transmission method to which various embodiments of the present disclosure are applicable.

FIG. 6 is an exemplary SSB transmission method to which various embodiments of the present disclosure are applicable.

Referring to FIG. 6, an SSB is periodically transmitted according to an SSB periodicity. A basic SSB periodicity assumed by the UE in the initial cell search is defined as 20 ms. After cell access, the SSB periodicity may be set to one of {5 ms, 10 ms, 20 ms, 40 ms, 80 ms, 160 ms} by the network (e.g., the BS). An SSB burst set is configured at the beginning of an SSB period. The SSB burst set may be configured in a 5-ms time window (i.e., half-frame), and an SSB may be repeatedly transmitted up to L times within the SS burst set. The maximum number L of transmissions of the SSB may be given according to the frequency band of a carrier as follows. One slot includes up to two SSBs.

For frequency range up to 3 GHz, L=4
For frequency range from 3 GHz to 6 GHz, L=8
For frequency range from 6 GHz to 52.6 GHz, L=64

The time position of an SSB candidate in the SS burst set may be defined according to an SCS as follows. The time positions of SSB candidates are indexed as (SSB indexes) 0 to L−1 in temporal order within the SSB burst set (i.e., half-frame).

Case A: 15-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case B: 30-kHz SCS: The indexes of the first symbols of candidate SSBs are given as {4, 8, 16, 20}+28*n where n=0 for a carrier frequency equal to or lower than 3 GHz, and n=0, 1 for a carrier frequency of 3 GHz to 6 GHz.

Case C: 30-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case D: 120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 fora carrier frequency above 6 GHz.

Case E: 240-kHz SCS: The indexes of the first symbols of candidate SSBs are given as {8, 12, 16, 20, 32, 36, 40, 44}+56*n where n=0, 1, 2, 3, 5, 6, 7, 8 for a carrier frequency above 6 GHz.

1.5. Channel State Information (CSI)

In the new radio (NR) system, a channel state information reference signal (CSI-RS) may be used for time/frequency tracking, CSI computation, reference signal received power (RSRP) computation, and mobility. Here, the CSI computation is related to CSI acquisition, and the RSRP computation is related to beam management (BM).

Figure 7:
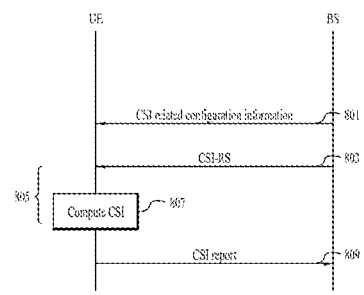
FIG. 7 is a diagram illustrating an exemplary channel state information (CSI) related process to which various embodiments of the present disclosure are applicable.

FIG. 7 is a diagram illustrating an exemplary CSI-related process to which various embodiments of the present disclosure are applicable.

For one of the CSI-RS purposes, a UE receives CSI related configuration information from a BS through RRC signaling (801).

The CSI related configuration information may include at least one of CSI Interference management (IM) resource related information, CSI measurement configuration related information, CSI resource configuration related information, CSI-RS resource related information, or CSI report configuration related information.

i) The CSI-IM resource related information may include CSI-IM resource information, CSI-IM resource set information, etc. A CSI-IM resource set is identified by a CSI-IM resource set ID, and one resource set includes at least one CSI-IM resource. Each CSI-IM resource is identified by a CSI-IM resource ID.

ii) The CSI resource configuration related information may be represented by a CSI-ResourceConfigIE. The CSI resource configuration related information defines a group including at least one of a non-zero power (NZP) CSI-RS resource set, a CSI-IM resource set, or a CSI-SSB resource set. That is, the CSI resource configuration related information includes a list of CSI-RS resource sets, and the CSI-RS resource set list may include at least one of a NZP CSI-RS resource set list, a CSI-IM resource set list, or a CSI-SSB resource set list. The CSI-RS resource set is identified by a CSI-RS resource set ID, and one resource set includes at least one CSI-RS resource. Each CSI-RS resource is identified by a CSI-RS resource ID.

To indicate the usage of the CSI-RS for each NZP CSI-RS resource set, RRC parameters (e.g., BM related parameter 'repetition', tracking related parameter 'trs-Info', etc.) may be configured iii) The CSI report configuration related information includes the parameter reportConfigType indicative of time domain behavior and the parameter reportQuantity indicative of CSI related quantity to be reported. The time domain behavior may be periodic, aperiodic, or semi-persistent.

The UE measures CSI based on the CSI related configuration information (803). The CSI measurement may include: (1) receiving the CSI-RS by the UE (805); and (2) computing the CSI based on the received CSI-RS (807). In the case of the CSI-RS, CSI-RS resource RE mapping is performed in the time and frequency domains based on the RRC parameter CSI-RS-ResourceMapping.

The UE reports the measured CSI to the BS (809).

1.5.1. CSI Measurement

The NR system supports more flexible and dynamic CSI measurement and reporting. The CSI measurement may include receiving a CSI-RS and acquiring CSI by measuring the received CSI-RS.

As time domain behaviors for the CSI measurement and reporting, channel measurement (CM) and Interference measurement (IM) are supported.

A CSI-IM-based IM resource (IMR) of NR has a design similar to CSI-IM of LTE, and it is configured independently of ZP CSI-RS resources for PDSCH rate matching.

The BS transmits a NZP CSI-RS to the UE on each port of the configured NZP CSI-RS-based IMR.

If there is no PMI or RI feedback for a channel, a plurality of resources may be configured in a set, and the BS or network may indicate a subset of NZP CSI-RS resources for channel/Interference measurement through DCI.

Hereinafter, a resource setting and resource setting configuration will be described in detail.

1.5.2. Resource Setting

Each CSI resource setting CSI-ResourceConfig includes a configuration of S≥1 CSI resource sets (which is given by the RRC parameter csi-RS-ResourceSetList). Here, the CSI resource setting corresponds to a CSI-RS resource set list, S denotes the number of configured CSI-RS resource sets, and the configuration of S≥1 CSI resource sets includes each CSI resource set including CSI-RS resources (composed of the NZP CSI-RS or CSI-IM) and SSB resources used for RSRP computation.

Each CSI resource setting is positioned in a DL BWP identified by the RRC parameter bwp-id. All CSI resource settings linked to a CSI reporting setting have the same DL BWP.

The time domain behavior of CSI-RS resources within the CSI resource setting included in CSI-ResourceConfigIE may be indicated by the RRC parameter resourceType. In this case, the time domain behavior may be configured to be aperiodic, periodic, or semi-persistent.

One or more CSI resource settings may be configured for channel measurement (CM) and Interference measurement (IM) by RRC signaling. A NZP CSI-RS for CSI acquisition may be a channel measurement resource (CMR), and a NZP CSI-RS for CSI-IM and IM may be an Interference measurement resource (IMR). In this case, the CSI-IM (or a ZP CSI-RS for IM) may be primarily used for inter-cell Interference measurement, and the NZP CSI-RS for IM may be primarily used for intra-cell Interference measurement between multiple users.

The UE may assume that CSI-RS resource(s) for channel measurement and CSI-IM/NZP CSI-RS resource(s) for Interference measurement configured for one CSI report is 'QCL-TypeD' resource-wise.

1.5.3. Resource Setting Configuration

A resource setting may mean a resource set list. One reporting setting may be linked to up to three resource settings.

When one resource setting is configured, a resource setting (given by the RRC parameter resourcesForChannelMeasurement) is for channel measurement for RSRP computation.

When two resource settings are configured, the first resource setting (given by the RRC parameter resourcesForChannelMeasurement) is for channel measurement, and the second resource setting (given by csi-IM-ResourcesForInterference or nzp-CSI-RS-ResourcesForInterference) is for Interference measurement performed on the CSI-IM or NZP CSI-RS.

When three resource settings are configured, the first resource setting (given by resourcesForChannelMeasurement) is for channel measurement, the second resource setting (given by csi-IM-ResourcesForInterference) is for CSI-IM based Interference measurement, and the third resource setting (given by nzp-CSI-RS-ResourcesForInterference) is for NZP CSI-RS based Interference measurement.

When one resource setting (given by resourcesForChannelMeasurement) is configured, the resource setting is for channel measurement for RSRP computation.

When two resource settings are configured, the first resource setting (given by resourcesForChannelMeasurement) is for channel measurement, and the second resource setting (given by the RRC layer parameter csi-IM-ResourcesForInterference) is used for Interference measurement performed on the CSI-IM.

1.5.4. CSI Computation

If Interference measurement is performed on the CSI-IM, each CSI-RS resource for channel measurement is resource-wise associated with a CSI-IM resource in the ordering of CSI-RS resources and CSI-IM resources in a corresponding resource set. The number of CSI-RS resources for channel measurement is the same as the number of CSI-IM resources.

For CSI measurement, the UE assumes the following.

Each NZP CSI-RS port configured for Interference measurement corresponds to an Interference transmission layer.

All Interference transmission layers on NZP CSI-RS ports for Interference measurement take into account energy per resource element (EPRE) ratios.

Different Interference signals are assumed on RE(s) of an NZP CSI-RS resource for channel measurement, an NZP CSI-RS resource for Interference measurement, or a CSI-IM resource for Interference measurement.

1.5.5. CSI Reporting

For CSI reporting, the BS controls time and frequency resources available for the UE.

For the CQI, PMI, CRI, SSBRI, LI, RI, and RSRP, the UE may receive RRC signaling containing N≥1 CSI-Report-Config reporting settings, M≥1 CSI-ResourceConfig resource settings, and one or two lists of trigger states (provided by aperiodicTriggerStateList and semiPersistenOnPUSCH-TriggerStateList). Each trigger state in aperiodicTriggerStateList contains a list of associated CSI-Report-Configs indicating resource set IDs for channel and optionally for Interference. Each trigger state in semiPersistentOnPUSCH-TriggerStateList contains one associated CSI-ReportConfig.

For each CSI-RS resource setting, the UE transmits to the BS a CSI report indicated by CSI-ReportConfigs associated with a corresponding CSI resource setting. For example, the UE may report at least one of the CQI, PMI, CRI, SSBRI, LI, RI, and RSRP as indicated by CSI-ReportConfigs associated with the corresponding CSI resource setting. However, if CSI-ReportConfigs associated with the corresponding CSI resource setting indicates 'none', the UE may not report CSI or RSRP associated with the corresponding CSI resource setting. The CSI resource setting may include resources for an SS/PBCH block.

2. POSITIONING

Positioning may refer to determining the geographical position and/or velocity of the UE based on measurement of radio signals. Location information may be requested by and reported to a client (e.g., an application) associated with to the UE. The location information may also be requested by a client within or connected to a core network. The location information may be reported in standard formats such as formats for cell-based or geographical coordinates, together with estimated errors of the position and velocity of the UE and/or a positioning method used for positioning.

For such positioning, a positioning reference signal (PRS) may be used. The PRS is a reference signal used to estimate the position of the UE.

2.1. Positioning Reference Signal (PRS) in LTE System

For example, in the LTE system, the PRS may be transmitted only in a DL subframe configured for PRS transmission (hereinafter, "positioning subframe"). If both a multimedia broadcast single frequency network (MBSFN) subframe and a non-MBSFN subframe are configured as positioning subframes, OFDM symbols of the MBSFN subframe should have the same cyclic prefix (CP) as subframe #0. If only MBSFN subframes are configured as the positioning subframes within a cell, OFDM symbols configured for the PRS in the MBSFN subframes may have an extended CP.

The sequence of the PRS may be defined by Equation 1 below.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$

$$m = 0, 1, \ldots, 2N_{RB}^{max,DL} - 1$$

In Equation 1, $n_s$ denotes a slot number in a radio frame and l denotes an OFDM symbol number in a slot. $N_{RB}^{max,DL}$ is the largest of DL bandwidth configurations, expressed as $N_{SC}^{RB}$. $N_{SC}^{RB}$ denotes the size of an RB in the frequency domain, for example, 12 subcarriers.

c(i) denotes a pseudo-random sequence and may be initialized by Equation 2 below.

$$c_{init} = 2^{28} \cdot \lfloor N_{ID}^{PRS}/512 \rfloor + \quad \text{[Equation 2]}$$
$$2^{10} \cdot (7 \cdot (n_s + 1) + l + 1) \cdot (2 \cdot (N_{ID}^{PRS} \bmod 512) + 1) +$$
$$2 \cdot (N_{ID}^{PRS} \bmod 512) + N_{CP}$$

Unless additionally configured by higher layers, $N_{ID}^{PRS}$ is equal to $N_{ID}^{cell}$, and $N_{CP}$ is 1 for a normal CP and 0 for an extended CP.

FIG. 7 illustrates an exemplary pattern to which a PRS is mapped in a subframe.

As illustrated in FIG. 7, the PRS may be transmitted through an antenna port 6. FIG. 7(a) illustrates mapping of the PRS in the normal CP and FIG. 7(b) illustrates mapping of the PRS in the extended CP.

The PRS may be transmitted in consecutive subframes grouped for position estimation. The subframes grouped for position estimation are referred to as a positioning occasion. The positioning occasion may consist of 1, 2, 4 or 6 subframe. The positioning occasion may occur periodically with a periodicity of 160, 320, 640 or 1280 subframes. A cell-specific subframe offset value may be defined to indicate the starting subframe of PRS transmission. The offset value and the periodicity of the positioning occasion for PRS transmission may be derived from a PRS configuration index as listed in Table 9 below.

TABLE 9

| PRS configuration Index ($I_{PRS}$) | PRS periodicity (subframes) | PRS subframe offset (subframes) |
|---|---|---|
| 0-159 | 160 | $I_{PRS}$ |
| 160-479 | 320 | $I_{PRS}$ − 160 |
| 480-1119 | 640 | $I_{PRS}$ − 480 |
| 1120-2399 | 1280 | $I_{PRS}$ − 1120 |
| 2400-2404 | 5 | $I_{PRS}$ − 2400 |
| 2405-2414 | 10 | $I_{PRS}$ − 2405 |
| 2415-2434 | 20 | $I_{PRS}$ − 2415 |
| 2435-2474 | 40 | $I_{PRS}$ − 2435 |
| 2475-2554 | 80 | $I_{PRS}$ − 2475 |
| 2555-4095 | Reserved | |

A PRS included in each positioning occasion is transmitted with constant power. A PRS in a certain positioning occasion may be transmitted with zero power, which is referred to as PRS muting. For example, when a PRS transmitted by a serving cell is muted, the UE may easily detect a PRS of a neighbor cell.

The PRS muting configuration of a cell may be defined by a periodic muting sequence consisting of 2, 4, 8 or 16 positioning occasions. That is, the periodic muting sequence may include 2, 4, 8, or 16 bits according to a positioning occasion corresponding to the PRS muting configuration and each bit may have a value "0" or "1". For example, PRS muting may be performed in a positioning occasion with a bit value of "0".

The positioning subframe is designed as a low-Interference subframe so that no data is transmitted in the positioning subframe. Therefore, the PRS is not subjected to Interference due to data transmission although the PRS may interfere with PRSs of other cells.

2.2. UE Positioning Architecture in NR System

Figure 8:
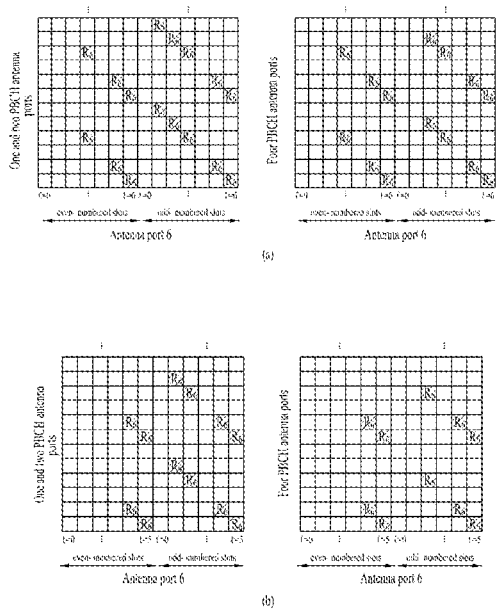
FIG. 8 illustrates exemplary mapping of a positioning reference signal (PRS) in a long term evolution (LTE) system to which various embodiments of the present disclosure are applicable.

FIG. 8 illustrates architecture of a 5G system applicable to positioning of a UE connected to an NG-RAN or an E-UTRAN.

Referring to FIG. 8, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

2.3. Operation for UE Positioning

Figure 9:
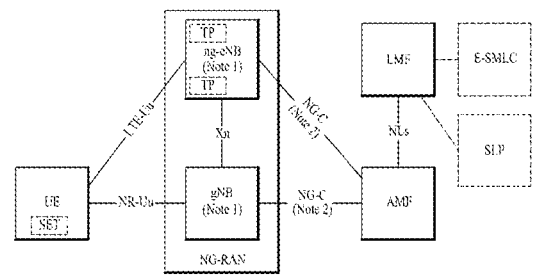
FIG. 9 is a diagram illustrating an example of an architecture of a system for positioning a user equipment (UE) to which various embodiments of the present disclosure are applicable.

FIG. 9 illustrates an implementation example of a network for UE positioning.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 9. In other words, in FIG. 9 it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 9. In step 1*a*, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1*b*. For example, the serving AMF may determine that itself will perform the location service in order to measure the position of the UE for an emergency call.

In step 2, the AMF transfers the request for the location service to an LMF. In step 3*a*, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3*a* may be an NRPPa protocol which will be described later.

Additionally, in step 3*b*, the LMF may initiate a location procedure for DL positioning together with the UE. For example, the LMF may transmit the location assistance data to the UE or obtain a location estimate or location measurement value. For example, in step 3*b*, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3*b*, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3b, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 9 has been initiated by step 1a, the AMF may transfer the location service response to a 5GC entity such as a GMLC. If the procedure of FIG. 9 has been initiated by step 1b, the AMF may use the location service response in order to provide a location service related to an emergency call.

2.4. Positioning Protocol 2.4.1. LTE Positioning Protocol (LPP)

Figure 10:
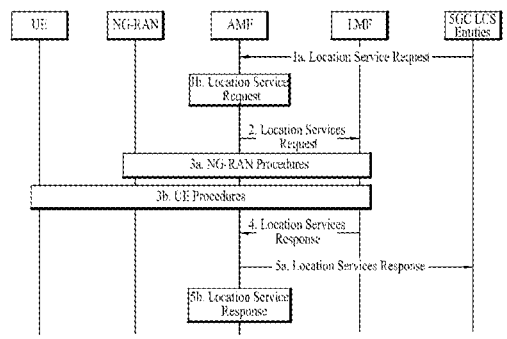
FIG. 10 is a diagram illustrating an example of a procedure of positioning a UE to which various embodiments of the present disclosure are applicable.

FIG. 10 illustrates an exemplary protocol layer used to support LPP message transfer between an LMF and a UE. An LPP protocol data unit (PDU) may be carried in a NAS PDU between an AMF and the UE.

Referring to FIG. 10, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

2.4.2. NR Positioning Protocol A (NRPPa)

Figure 11:
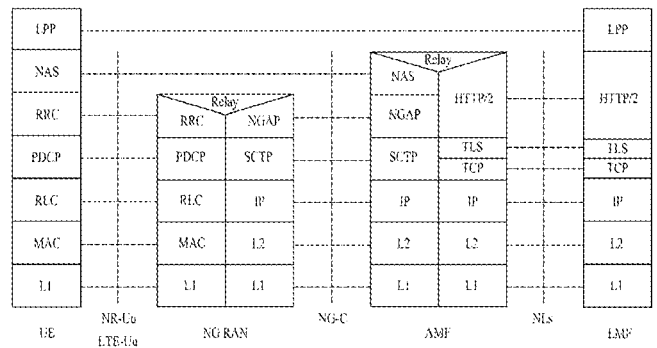
FIG. 11 is a diagram illustrating protocol layers for supporting LTE positioning protocol (LPP) message transmission, to which various embodiments are applicable.

FIG. 11 illustrates an exemplary protocol layer used to support NRPPa PDU transfer between an LMF and an NG-RAN node.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.5. Positioning Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

2.5.1. Observed Time Difference Of Arrival (OTDOA)

FIG. 12 is a view illustrating an OTDOA positioning method.

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 3 below.

$$RSTDi, 1 = \frac{\sqrt{(x_t - x_i)^2 + (y_t - y_i)^2}}{c} - \frac{\sqrt{(x_t - x_1)^2 + (y_t - y_1)^2}}{c} + (Ti - T1) + (ni - n1)$$

[Equation 3]

In Equation 3, c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i - T_1)$ is a transmission time offset between two TPs, referred to as "real time differences" (RTDs), and $n_i$ and $n_1$ are UE ToA measurement error values.

2.5.2. Enhanced Cell ID (E-CID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (Rx)-transmission (Tx) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB Rx-Tx time difference, timing advance ($T_{ADV}$), and/or AoA Here, $T_{ADV}$ may be divided into Type 1 and Type 2 as follows.

$T_{ADV}$ Type 1 = (ng − eNB Rx − Tx time difference) +

(UE E − UTRA Rx − Tx time difference)

$T_{ADV}$ Type 2 = ng − eNB Rx − Tx time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

2.5.3. Uplink Time Difference of Arrival (UTDOA)

UTDOA is to determine the position of the UE by estimating the arrival time of an SRS. When an estimated SRS arrival time is calculated, a serving cell is used as a reference cell and the position of the UE may be estimated by the arrival time difference with another cell (or an eNB/TP). To implement UTDOA, an E-SMLC may indicate the serving cell of a target UE in order to indicate SRS transmission to the target UE. The E-SMLC may provide configurations such as periodic/non-periodic SRS, bandwidth, and frequency/group/sequence hopping.

3. VARIOUS EMBODIMENTS OF THE PRESENT DISCLOSURE

Various embodiments of the present disclosure will be described below in detail based on the above-described technical idea. Clause 1 and clause 2 may be applied to the various embodiments of the present disclosure. For example, operations, functions, and terms which are not defined in the various embodiments of the present disclosure may be performed and described based on clause 1 and clause 2.

Symbol/abbreviations/terms used in the following description of various embodiments of the present disclosure are described below.

AOA (AoA): angle of arrival
AOD (AoD): angle of departure
CSI-RS: channel state information reference signal
ECID: enhanced cell identifier
GPS: global positioning system
GNSS: global navigation satellite system
LMF: location management function
NRPPa: NR positioning protocol a
OTDOA (OTDoA): observed time difference of arrival
PRS: positioning reference signal
RAT: radio access technology
RS: reference signal RTT: round trip time
RSTD: reference signal time difference/relative signal time difference
SRS: sounding reference signal
TDOA (TDoA): time difference of arrival
TOA (ToA): time of arrival
TRP (TP): transmission (and reception) point
UTDOA (UTDoA): uplink time difference of arrival As more and more communication devices have demanded larger communication traffic along with the trend of the times, the next-generation wireless broadband communication system improved from the LTE system, 5G is required. The next-generation 5G system is called new RAT (NR), for convenience.

With the introduction of the NR system, the usefulness of joint utilization between measurement information obtained by UE sensor-based positioning and measurement information obtained by RAT-dependent positioning is under discussion.

Considering that narrow beams are used, the TOA varies for each beam (for example, for each of a plurality of PRS resources), and beam reflection occurs due to blocks in the NR system, it may be difficult for the UE to assume that the direction of a received beam is line of sight (LoS).

In various embodiments of the present disclosure, a positioning method for accurately measuring the location of a UE in such an environment and apparatus for supporting the same are provided.

In an exemplary embodiment, a positioning method for accurately measuring the location of a UE in the NR wireless communication system using narrow beams by including beam information (e.g., PRS resource information and/or PRS resource set information) in reference configuration information for OTDOA and apparatus for supporting the same are provided.

For example, assuming that PRS resource set 1={0, 1, 2, 3} and PRS resource set 2={0, 1, 2, 3}, PRS resources (or PRS resource IDs) of each set have the same value, and as a result, the PRS resources may not be distinguished by PRS resource (ID) information (in this example, the elements of each set correspond to PRS resources (or PRS resource IDs)). Accordingly, PRS resource set (ID) information may be provided together. As another example, if a PRS resource is distinguished from either a PRS resource set (ID) or a PRS resource (ID), either information on the corresponding PRS resource set (ID) or information on the PRS resource (ID) may be provided.

In an exemplary embodiment, a positioning method by which a UE measures an RSTD by selecting a PRS resource and/or PRS resource set suitable for the UE and reports information on the selected PRS resource and/or PRS resource set in order to accurately measure the location of the UE and apparatus for supporting the same are provided.

Figure 14:
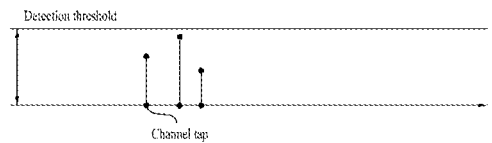
FIG. 14 is a diagram illustrating an example in which a UE measures a time of arrival (ToA) according to various embodiments of the present disclosure.

FIG. 14 is a diagram illustrating an example in which a UE measures a TOA according to various embodiments of the present disclosure.

To estimate the location of a UE based on UE positioning methods such as OTDOA, multi-cell RTT, etc., it is necessary to obtain a ToA measurement based on a DL RS such as a PRS, a CSI-RS, and an SS/PBCH block. However, the reliability and/or accuracy of the measured ToA may vary depending on the presence or absence of a LoS component or the signal strength/power of a first path. In some cases, the measured ToA may not correspond to the first arrival path.

When the UE measures a ToA for an RS such as a PRS, a CSI-RS, and an SS/PBCH block transmitted from a specific TP/BS, all channel taps may be lower than or similar to a specific threshold (e.g., noise level) as shown in FIG. 14. As a result, the ToA measurement may be practically impossible, or the measurement reliability may be quite low.

The measurement reliability/quality may be present not only for the ToA measurement but also for various measurements such an RSTD, an angle-related measurement (AoA), a UE RX-TX time difference, etc.

Thus, the UE may declare/define detection failure for the measurement such as the ToA/RSTD/AoA/UE RX-TX time difference obtained from the RS (e.g., PRS) transmitted by the specific TP/BS/cell and report the detection failure to the BS/LMF. The UE may request/recommend to the BS/LMF to reconfigure RS resources for re-measurement/re-acquisition of the ToA/RSTD/AoA/UE RX-TX time difference measurement. Here, reporting the detection failure to the BS/LMF may correspond to an operation by which the UE informs the BS/LMF that the reliability or quality of the ToA/RSTD/AoA/UE RX-TX time difference measurement is considerably low or not valid. UE operations with the same functionality or related BS/LMF operations may be included in the spirit of the present disclosure.

The following embodiments may be configured/instructed for the detection failure operation.

(1) The LMF/BS may configure/instruct the UE to define a very large value as one of the error values of "OTDOA-MeasQuality", which is a higher layer parameter indicating OTDOA measurement quality, and then report the detection failure. For example, if the UE reports "infinity" as the error value to the LMF/BS, the LMF/BS may recognize that the ToA value is not valid.

(2) A parameter may be introduced to indicate the quality of the AoA/RSTD/UE RX-TX time difference measurement. The quality of the AoA/RSTD/UE RX-TX time difference measurement may also be included as an error value. The UE may be configured to define and report a very large value as one of the error values reported by the UE.

The operation in which the UE declares/reports the detection failure or the operation in which the UE reports that the ToA/RSTD/UE RX-TX time difference value is not valid may be performed for a specific TP/cell/BS, but the operation may also be performed for a specific PRS resource and/or a specific PRS resource set. For example, the UE may not know which TP/BS transmits the specific PRS resource and/or PRS resource set in an explicit or implicit way. In other words, if the UE is not configured with the identification (ID) of the TP/BS associated with the specific PRS, the UE may not know the TP/BS that has transmitted the specific PRS resource, and only the LMF/BS may know the TP/BS. In the above situation, the following embodiments may be considered for the detection failure operation.

(1) The BS/LMF may configure/indicate to the UE a specific RS (e.g., PRS, CSI-RS, or SS/PBCH block) resource and/or a specific RS (e.g., PRS, CSI-RS, or SS/PBCH block) resource set. In addition, the configured RS resource and/or resource set may be used for UE positioning. When the measurements (e.g., ToA/RSTD/AoA/UE RX-TX time difference) measured by the UE for all RS resources included in the specific RS resource set are less than or equal to a specific threshold, the UE may report the detection failure to the BS/LMF.

(2) When the ToA/RSTD/AOA/UE RX-TX time difference measurement obtained for some X (>0) RS resource sets among a plurality of RS (e.g., PRS, CSI-RS, or SS/PBCH block) resource sets or the quality of the measurement is less than or equal to the specific threshold, the UE may report the detection failure to the BS/LMF.

(3) When the ToA/RSTD/AOA/UE RX-TX time difference measurement obtained for some Y (>0) RS resources among configured RS (e.g., PRS, CSI-RS, or SS/PBCH block) resources or the quality of the measurement is less than or equal to the specific threshold, the UE may report the detection failure to the BS/LMF.

The above-described threshold may be defined/set/used as a default value, and the BS/LMF may separately configure/indicate the specific threshold to the UE.

In addition, based on the above-described detection failure operation, the UE may declare the detection failure for each RS resource and/or RS resource set and then report the detection failure to the BS/LMF. For example, when the measurement for a specific RS resource is less than or equal to the specific threshold, the UE may report the detection failure to the BS/LMF, instead of reporting the measurement. In other words, if the measurement of an RS resource is more than the specific threshold, the UE may report the corresponding measurement. On the other hand, if the measurement of an RS resource is less than or equal to the specific threshold, the UE may report the detection failure state. The BS/LMF may select measurements to be used for positioning based on the received report in order to improve the accuracy of the UE positioning and may strategically determine a positioning method to be used for the UE positioning.

FIGS. 15 to 18 illustrate exemplary operations of a UE, a BS, and a location server regarding Embodiments 1 to 3 based on the above-described examples. Each step of FIGS. 15 to 18 may be performed simultaneously or independently.

Figure 15:
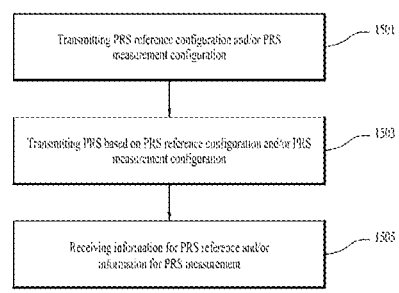
FIG. 15 is a diagram illustrating exemplary operations of a base station (BS) according to various embodiments of the present disclosure.

FIG. 15 is a diagram illustrating the operations of the BS according to various embodiments of the present disclosure.

Referring to FIG. 15, the BS may transmit a PRS reference configuration and/or a PRS measurement configuration (1501). The BS may transmit a PRS based on the PRS reference configuration and/or the PRS measurement configuration (1503) and receive PRS reference related information and/or PRS measurement related information from the UE (1505). Meanwhile, specific methods for performing operations 1501 to 1505 according to exemplary embodiments will be described in Embodiments 1 to 3.

Figure 16:
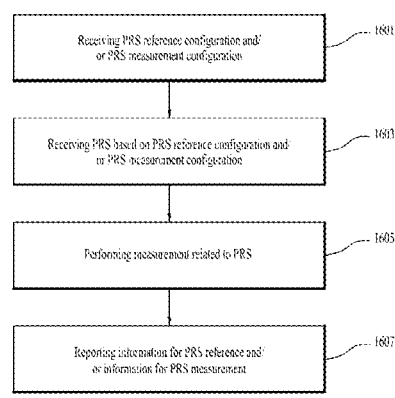
FIG. 16 is a diagram illustrating exemplary operations of a UE according to various embodiments of the present disclosure.

FIG. 16 is a diagram illustrating the operations of the UE according to various embodiments of the present disclosure.

Referring to FIG. 16, the UE may receive a PRS reference configuration and/or a PRS measurement configuration (1601). The UE may receive a PRS based on the PRS reference configuration and/or the PRS measurement configuration (1603) and perform PRS related measurement (1605). The UE may report PRS reference related information and/or PRS measurement related information to the BS and/or location server based on the measurement (1607). Meanwhile, specific methods for performing operations 1601 to 1607 according to exemplary embodiments will be described in Embodiments 1 to 3.

Figure 17:
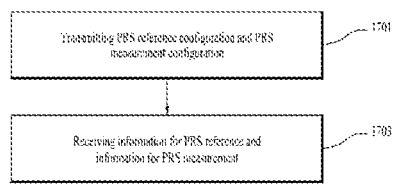
FIG. 17 is a diagram illustrating exemplary operations of a location server according to various embodiments of the present disclosure.

FIG. 17 is a diagram illustrating the operations of the location server according to various embodiments of the present disclosure.

Referring to FIG. 17, the location server may transmit a PRS reference configuration and/or a PRS measurement configuration to the BS and/or UE (1701). In addition, the location server may receive PRS reference related information and/or PRS measurement related information from the UE and/or BS (1703). Meanwhile, specific methods for performing operations 1701 to 1703 according to exemplary embodiments will be described in Embodiments 1 to 3.

Figure 18:
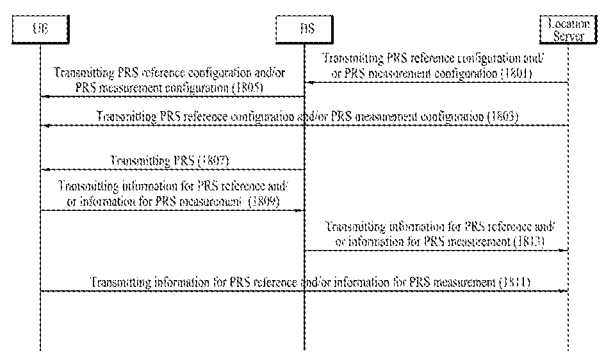
FIG. 18 is a diagram illustrating exemplary operations of a network according to various embodiments of the present disclosure.

FIG. 18 is a diagram illustrating the operations of a network according to various embodiments of the present disclosure.

The location server may transmit a PRS reference configuration and/or a PRS measurement configuration to the BS and/or UE (1801 to 1803). If the location server transmits the PRS reference configuration and/or the PRS measurement configuration only to the BS, the BS may forward the PRS reference configuration and/or the PRS measurement configuration to the UE (1805).

For example, if operations 1801 and 1805 according to exemplary embodiments are performed, operation 1803 according to an exemplary embodiment may be omitted. If operation 1803 according to the exemplary embodiment is performed, operations 1801 and 1805 according to the exemplary embodiments may be omitted. That is, whether operations 1801 and 1805 according to the exemplary embodiments or operation 1803 according to the exemplary embodiment is performed may be alternate.

The BS may transmit a PRS based on the PRS reference configuration and/or the PRS measurement configuration (1807). Upon receiving the PRS, the UE may perform PRS related measurement and report PRS reference related information and/or PRS measurement related information to the BS and/or location server based on the measurement (1809 to 1811). If the UE reports the PRS reference related information and/or PRS measurement related information only to the BS, the BS may forward the PRS reference related information and/or PRS measurement related information to the location server (1813).

For example, if operations 1809 and 1813 according to exemplary embodiments are performed, operation 1811 according to an exemplary embodiment may be omitted. If operation 1811 according to the exemplary embodiment is performed, operations 1809 and 1813 according to the exemplary embodiments may be omitted. That is, whether operations 1809 and 1813 according to the exemplary embodiments or operation 1911 according to the exemplary embodiment is performed may be alternate. Meanwhile, specific operation processes for operations 1801 to 1813 according to exemplary embodiments may be based on Embodiments 1 to 3, which will be described later.

The UE may report the detection failure for the above-described UE measurements (e.g., ToA/RSTD/AoA/UE RX-TX time difference) in order to inform the BS/LMF that even if the UE reports the measurements by performing configured/indicated measurement, the measurements are not helpful for UE positioning due to significant measurement errors. Thus, based on the above information, when using a specific UE positioning method, the BS/LMF may exclude the measurements corresponding to the detection failure or change PRS resources used for the measurements and allocate the PRS resources to other PRSs.

Hereinafter, operations will be described in detail according to various embodiments of the present disclosure. All or some of the following embodiments of the present disclosure may be combined to implement another embodiment of the present disclosure unless they are mutually exclusive, which will be clearly understood by those of ordinary skill in the art.

3.1. Embodiment 1: Reference Cell and Neighbor Cell Configuration

Hereinafter, operations of Embodiment 1 will be described in detail according to various embodiments of the present disclosure. All or some of the following embodiments of the present disclosure may be combined to implement another embodiment of the present disclosure unless they are mutually exclusive, which will be clearly understood by those of ordinary skill in the art.

In the LTE system, when the LMF configures/indicates PRS resources to the UE, the LMF may configure/indicate information about a reference cell/TP and neighboring cells/TPs together. When the UE receives PRSs from a plurality of cells/TPs, if the quality of a ToA/ToF measurement received from the reference cell/TP is low, the UE may change the reference cell/TP and transmit to the LMF/BS information about the changed reference cell/TP and information about neighboring cells/TPs together with an RSTD report.

In the NR system, since each BS/TP transmits PRSs on a plurality of transmission beams, a different ToA/ToF measurement may be obtained for a PRS transmitted on each beam. Among PRS resources transmitted on the plurality of transmission beams, a specific PRS resource related to a minimum propagation time and/or ToA may be a criterion for obtaining/calculating an RSTD measurement. Therefore, in the NR system, when configuring PRSs, the BS may set the specific PRS resource as a reference resource for RSTD acquisition/calculation, instead of setting a reference cell as the criterion for obtaining/calculating the RSTD measurement. For example, a PRS resource set including a plurality of PRS resources may be associated with a specific BS/TP, and each of the plurality of PRS resources may be associated with each of a plurality of transmission beams used by the specific BS/TP. Thus, if the specific PRS resource is set as the reference resource, the UE may know a reference BS/TP and a reference transmission beam and obtain/calculate the RSTD based thereon. However, when one PRS resource is included in a plurality of PRS resource sets, a reference PRS resource set may need to be configured for the UE.

When the BS/LMF configures a PRS resource and/or a PRS resource set to the UE, if the BS/LMF configures/indicates only information about a reference cell/TP and information about neighboring cells/TPs, the UE may provide information a reference PRS resource and/or information about a reference cell together with the information the reference PRS resource to the LMF/BS while reporting an RSTD.

For example, the BS/LMF may configure information on at least one of a reference cell/TP, a reference PRS resource, or a reference PRS resource set to the UE. In addition, the UE may report information on at least one of a reference cell/TP, a reference PRS resource, and a reference PRS resource set actually used for RSTD measurement. For example, even if the BS/LMF configures information on only a reference cell/TP, the UE may report to the BS/LMF information about a reference cell/TP actually used for RSTD measurement and information about a reference PRS resource corresponding to a reference beam. To improve the accuracy of UE positioning, the UE may report information on a reference PRS resource and/or a reference PRS resource set actually used by the UE to the BS/LMF regardless of the configuration of BS/LMF.

Additionally, when reporting an RSTD to the LMF/BS, the UE may transmit information on a PRS resource with the smallest ToA/ToF and propagation delay time among a plurality of PRS resources transmitted from each neighboring cell. The PRS resource obtained from the above information may be used to determine a beam to be used when each BS/TP receives a UL reference signal, or the PRS resource may be used to measure AoD information for UE positioning.

Meanwhile, each of a plurality of transmission beams used by one BS/TP may have a different PRS resource and/or a different PRS resource set. For example, one transmission beam may be associated with one PRS resource, and thus, a different PRS resource may be configured for each transmission beam.

For OTDOA-based UE positioning, the UE needs to perform RSTD measurement and reporting. In this case, the accuracy/reliability of a ToA for a PRS transmitted from a reference TP/BS/cell, which corresponds to a reference to measure time differences, is very important. Therefore, when configuring PRSs, the BS/LMF may instruct the UE to receive PRSs from a plurality of cells and measure the ToA without distinguishing a reference cell and neighboring cells, instead of configuring/indicting the reference cell and neighboring cells to the UE in order to receive an RSTD measurement from the UE. The UE may use a specific PRS resource and/or a specific PRS resource index showing the best quality based on the measurement quality of the measured ToA as a reference for the RSTD measurement and reporting.

On the other hand, a two-step PRS transmission/reporting procedure may be considered based on the indication/configuration of the LMF/BS. In the first step, a rough UE location, a reference cell, a reference PRS resource, and/or a reference PRS resource set may be configured. In the first step, the UE may report to the BS/LMF a PRS resource, a PRS resource set, and/or a TP/BS/cell index with the best ToA/propagation delay time measurement quality. In the second step, the BS/LMF may transmit a PRS by allocating more resources such as power/time/frequency to the high-quality PRS resource based on the PRS resource information reported to the BS/LMF. In the second step, the UE may measure an RSTD based on the PRS transmitted by the BS and a reference TP/cell/PRS resources, which are configured by the BS or selected by the UE and report the RSTD to the BS/LMF.

The UE may request to allocate additional resources to a PRS transmitted from a specific TP/cell and/or on a specific transmission beam based on the quality of an acquired/measured ToA/ToF/OTDOTA measurement.

In addition, if the quality/reliability of a ToF/ToA measurement for a PRS transmitted from a reference cell and/or neighboring cell is significantly low, the UE may request/recommend the LMF/BS to change the reference cell and/or neighboring cell.

For example, if among N (>>1) PRSs received from TPs/cells, the quality of PRSs transmitted from K (<N) TPs/cells is good and the quality of the remaining PRSs is too low so that the remaining PRSs are not helpful for improving the positioning accuracy, the UE may request to allocate more power/time/frequency/space resources to the high-quality PRSs transmitted from the K TPs/cells. In addition, the UE may request the LMF/BS to change a low-quality neighboring TP/cell and/or serving TP/cell to another TP/cell.

Since the ToA measurement quality for a reference cell is the most important in calculating an RSTD value with a neighboring cell, the RSTD measurement quality for a plurality of neighboring cells is inevitably lowered if the ToA measurement quality of the reference cell is low. Therefore, in this case, if the reference cell is changed and more resources are allocated by the LMF to a PRS transmitted from a specific BS/TP, it is possible to increase the ToA measurement quality of the reference cell and increase the RSTD measurement quality.

3.2. Embodiment 2: Change of UE Positioning Method

Hereinafter, operations of Embodiment 2 will be described in detail according to various embodiments of the present disclosure. All or some of the following embodiments of the present disclosure may be combined to implement another embodiment of the present disclosure unless they are mutually exclusive, which will be clearly understood by those of ordinary skill in the art.

To measure the location of the UE based on the OTDOA method, it is necessary to obtain ToA information from at least three or more cells/BSs/TPs and report an RSTD to the LMF based on the ToA information. If the RSRP/SNR of a PRS received from another cell/TP/BS other than the serving cell/TP/BS is too low or if there is a directivity problem between the PRS transmission beam direction of a neighboring cell and the reception beam of the UE, the UE may not perform the detection. In this case, the UE may determine that there occur significant errors if the BS/LMF measures the location of the UE based the OTDOA method or that it is impossible to apply the OTDOA method. Therefore, if the UE is configured to request/recommend the LMF/BS to use other UE positioning methods, it may be useful for UE positioning.

Accordingly, a method by which the UE requests the BS/LMF to change the positioning method will be described in Embodiment 2.

When the reliability and/or quality of a measurement obtained for a PRS resource and/or a PRS resource set configured by the BS/LMF is less than or equal to a specific threshold, the UE may recommend/request/report to the BS/LMF that UE positioning based on reporting contents currently configured/indicated to the UE is not suitable.

For example, when the UE reports to the BS/LMF a specific value and/or specific information which means that "UE positioning is not suitable", the BS/LMF may interpret the specific value and/or specific information to mean that even if the UE positioning is executed, the UE positioning has low reliability or significant positioning errors. For example, if the UE is instructed to report a ToA/RSTD value, if the quality of an RSTD or ToA measurement is less than or equal to a threshold, the UE may request/recommend/report to LMF/BS that the OTDOA-based UE positioning it is not suitable.

When the reliability and/or quality of a measurement for a PRS resource and/or a PRS resource set configured by the BS/LMF is less than or equal to a threshold, the UE may recommend/request/report to the BS/LMF to use another UE positioning method instead of a UE positioning method based on the currently configured/indicated reporting contents.

In addition, the UE may recommend/request/report to use another UE positioning method in addition to the UE positioning method that uses the reporting contents currently configured/indicated to the UE.

If different positioning methods are used together, the UE positioning accuracy may be improved. For example, when the UE is configured to report a ToA/RSTD value, if the quality of an RSTD and/or ToA measurement is below a threshold but the quality of an RSRP measurement measured with the same PRS is guaranteed to be above a certain level, the UE may request/recommend/report to the LMF/BS to use an AoD-based UE positioning method and/or a UE positioning method based on the signal strength of a reference signal in addition to the OTDOA method.

Here, the quality of an RSTD measurement may be replaced with the SNR/RSRP. However, considering that the RSTD is basically calculated based on a difference between ToA measurements for PRSs transmitted from a plurality of cells, if the ToA measurement reliability of a reference cell is high but the reliability of a ToA measurement measured for a PRS received from another cell/BS is quite low, the RSTD measurement quality may be low. Thus, even if the RSRP of the reference cell is sufficiently large, the RSTD quality may be significantly low.

Therefore, for example, even if the UE is configured to report a ToA/RSTD value, if the quality of a ToA/RSTD measurement is not sufficiently high, the UE may recommend/request to the BS to use a UE positioning method based on angles such as an AoD/AoA or a specific RAT-independent positioning method based on the GNSS or UE sensors together.

When the reliability and/or quality of a measurement obtained for a PRS resource and/or a PRS resource set configured by the BS/LMF is less than or equal to a specific threshold, the UE may report other measurement information more appropriate for UE positioning in addition to the currently configured/indicated reporting contents. The above-described UE operation may be indicated/configured by the BS/LMF to the UE.

For example, when the reliability and/or quality of a ToA/RSTD measurement obtained based on a PRS resource is less than or equal to a threshold or the error range of the ToA/RSTD measurement is too large, that is, more than or equal to a specific threshold, the UE may report the index of the PRS resource and/or the RSRP of the corresponding PRS resource to assist in obtaining the location of the UE based on the direction (e.g., angle) of a PRS transmission beam transmitted by the TP/BS and signal strength, instead of reporting the ToA/RSTD measurement. The above UE operation may be configured/instructed by the BS/LMF to the UE, or the UE may determine by itself and perform the above operation.

For example, when the UE determines that the OTDOA-based UE positioning is not suitable, the UE may request the BS/LMF to estimate the location of the UE based on a PRS beam direction, a PRS resource index related to the PRS beam direction, and/or an RSRP according to a single-cell or multi-cell based E-CID method. In this case, the BS/LMF may determine the location of the UE based on information on the direction and angle of a transmission beam transmitted from each TP/BS and RSRP information.

Meanwhile, the PRS resource index reported by the UE may be the index of one PRS resource among PRS resources included in a specific PRS resource set or the index of one specific PRS resource among PRS resources transmitted by one specific TP/BS. For example, when the UE reports a PRS resource with the maximum RSRP value among PRS resources transmitted by each TP/BS, the BS/LMF may obtain the AoD of a PRS transmission beam from each TP/BS to determine the location of the UE. The threshold mentioned in the present embodiment may be configured/indicated by the BS/LMF to the UE or defined by default.

In the above-described embodiment, the BS/LMF may more effectively determine/change the positioning method for estimating the location of the UE according to the recommendation/request from the UE. For example, if the BS/LMF intends to perform the OTDOA-based UE positioning, the UE may operate as follows.

When the UE determines that it is difficult to use the OTDOA method that requires three or more cells/TPs/BSs at a specific time or that another UE positioning method based on two or less cells/TPs/BS is more suitable than the OTDOA method, based on measurements obtained from PRSs, the UE may request/recommend/report to the BS/LMF/location server to estimate the location of the UE according to a specific RAT-dependent and/or RAT-independent UE positioning method based on a single cell/TP and/or two cells/TPs. For example, when the UE determines, based on PRS measurement results, that the OTDOA method is not suitable, the UE may request/report to introduce a single cell-based E-CID method. The above-described UE operation may be configured/instructed by the BS/LMF/location server.

The operation by which the UE determines that another UE positioning method based on two or less cells/TPs/BS is more suitable than the OTDOA method may be defined/configured in various ways. Specifically, the following examples may be defined/configured. In addition, the following UE operations may be configured/instructed by the BS/LMF.

(1) The UE may perform measurement on an RS such as a PRS, a CSI-RS and an SS/PBCH block transmitted from the BS/LMF. If it is difficult to guarantee minimum ToA/RSTD quality, that is, quality above a specific threshold for three or more ToAs/RSTDs based on the measurement result, the UE may determine that the OTDOA method is not suitable for UE positioning. The ToA/RSTD quality may be defined as the error range of an expected ToA/RSTD and/or a distance error range corresponding to the ToA/RSTD.

(2) The UE may define/configure a very large value such as a positive infinity value among ToA/RSTD report values. Then, by reporting the ToA/RSTD value, the UE may inform the LMF/BS that the ToA/RSTD value for a PRS is not valid. This reporting operation may be considered as signaling that the UE requests/recommends to the LMF/BS to use another UE positioning method other than (or besides) the OTDOA method. In other words, when the BS/LMF receives a very large ToA/RSTD value, the BS/LMF may consider/recognize that the UE requests/recommends to use another method other than (or besides) the OTDOA method.

(3) The UE may define/configure a very small value such as a negative infinity value among ToA/RSTD quality report values. Then, by reporting the ToA/RSTD value, the UE may inform the LMF/BS that the ToA/RSTD for a PRS has very low quality and many errors. This reporting operation may be considered as signaling that the UE requests/recommends to the LMF/BS to use another UE positioning method other than (or besides) the OTDOA method. In other words, when the BS/LMF receives a very small ToA/RSTD value, the BS/LMF may consider/recognize that the UE requests/recommends to use another method other than (or besides) the OTDOA method.

(4) The UE may perform measurement on an RS such as a PRS, a CSI-RS and an SS/PBCH block transmitted from the BS/LMF. If the UE is incapable of measuring or reporting ToA/RSTD values for three or more TPs/cells/BSs and/or RS resources and/or RS resource sets related thereto, the UE may determine that it is more suitable to use another positioning method than the OTDOA method.

3.3. Embodiment 3: PRS Index Reporting Configuration for Multiple Positioning Methods Hereinafter, operations of Embodiment 3 will be described in detail according to various embodiments of the present disclosure. All or some of the following embodiments of the present disclosure may be combined to implement another embodiment of the present disclosure unless they are mutually exclusive, which will be clearly understood by those of ordinary skill in the art.

As described above, a polarity of positioning methods may be simultaneously used to estimate the location of the UE instead of using only one positioning method, thereby further improving the UE positioning accuracy.

If the location of the UE is estimated by using a positioning method that uses angle information such as an AoD and information such as a ToA together rather than using only the OTDOA method in which the UE reports only an RSTD value for location estimation, the UE positioning accuracy may be further improved.

When a plurality of positioning methods are used to estimate the location of the UE, the UE needs to transmit report values for carrying AoD information together with an RSTD. For example, the UE may report the ID of a PRS resource and the RSRP value for the PRS resource to transmit the AoD information. In other words, if the UE includes all of the PRS resource ID, RSRP value, and RSTD value in parameters for reporting PRS-related measurements to the location server, it may be interpreted to mean that the UE requests more advanced positioning from the location server or the location server requests the UE to report a variety of information for the more advanced positioning.

Upon receiving the PRS resource ID, RSRP value for the corresponding PRS resource, and RSTD value reported by the UE, the location server may estimate the location of the UE by using all the information in combination.

The UE may additionally report the following examples in addition to the RSTD for the above-described complex location estimation (1) PRS Resource Index+RSRP Here, the PRS resource index may be related to a PRS resource with a maximum RSRP value. The PRS resource index may be used for UE positioning based on the AoD of a PRS beam.

(2) PRS Resource Index+ToA/RSTD

Here, the PRS resource index may be related to a PRS resource having a minimum ToA value.

If the method of measuring the location of the UE based on the AoD of a PRS transmission beam of a TP/BS and the OTDOA-based UE positioning method based on the ToA/RSTD are used together, the UE may be configured/instructed to report the PRS resource index independently for each method. For example, the LMF/BS may configure/instruct the UE to report the ToA/RSTD and the PRS resource index related to the ToA/RSTD and the RSRP and the PRS resource index related to the RSRP.

The configuration/instruction related to the PRS resource index reporting may vary depending on whether the location of the UE is measured based on the AoD of the PRS transmission beam of the TP/BS or the location of the UE is measured based on the ToA/RSTD. For example, when the LMF/BS configures/instructs the UE to report the ToA/RSTD and the PRS resource index, the LMF/BS may configure/instruct the UE to report the index of the PRS resource having the minimum ToA value among PRS resources transmitted from one TP/BS. In addition, when the LMF/BS configures/instructs the UE to report the RSRP and the PRS resource index, the LMF/BS may configure/instruct the UE to report the index of the PRS resource having the maximum RSRP value among PRS resources transmitted from one TP/BS. Meanwhile, even if there is no separate indication/configuration, the UE may automatically report the PRS resource index according to the reporting configuration for the RSRP or ToA/RSTD.

For example, the UE may determine whether the PRS resource index to be reported is related to the minimum ToA/RSTD or the maximum RSRP depending on whether PRS measurement is used for the OTDOA-based UE positioning or the AoD-based UE positioning. The above-described UE operation may be defined as default UE operation even though there is no separate instruction/configuration from the BS/LMF, or the UE may automatically configure/execute the UE operation.

For the OTDOA-based UE positioning, the BS/LMF may configure/instruct the UE to report the ToA/RSTD and/or the PRS resource index together with the ToA/RSTD to the BS/LMF. At the same time, the BS/LMF may configure/instruct the UE to report the RSRP and PRS resource index rather than the ToA/RSTD and PRS resource index if the quality of a ToA/RSTD measurement measured by the UE is less than or equal to a threshold. If the UE reports the ToA/RSTD and PRS resource index, the corresponding PRS resource index may be the index of the PRS resource having the minimum ToA/RSTD value. If the UE reports the RSRP and PRS resource index, the corresponding PRS resource index may be the index of the PRS resource having the maximum RSRP value. The above-described UE operation may be separately configured/instructed by the BS/LMF to the UE, or the UE may automatically perform the above-described operation. Alternatively, the UE operation may be defined by default.

It is obvious that each of the examples of the proposed methods may also be included as one of various embodiments of the present disclosure, and thus each example may be regarded as a kind of proposed method. Although the proposed methods may be implemented independently, some of the proposed methods may be combined (or merged) and implemented. In addition, it may be regulated that information on whether the proposed methods are applied (or information on rules related to the proposed methods) are transmitted from the BS to the UE through a predefined signal (e.g., a physical layer signal, a higher layer signal, etc.).

3.4. Initial Network Access and Communication Process

According to various embodiments of the present disclosure, a UE may perform a network access process to perform the above-described/proposed procedures and/or methods. For example, the UE may receive system information and configuration information required to perform the above-described/proposed procedures and/or methods and store the received information in a memory. The configuration information required for various embodiments of the present disclosure may be received by higher-layer signaling (e.g., RRC signaling or MAC signaling).

Figure 19:
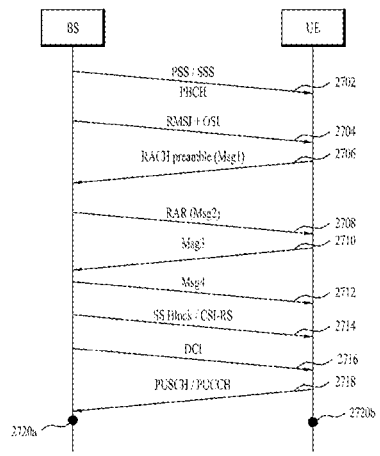
FIG. 19 is a simplified diagram illustrating an initial network access and subsequent communication procedure according to various embodiments of the present disclosure.

FIG. 19 is a diagram illustrating an initial network access and subsequent communication process. In an NR system to which various embodiments of the present disclosure are applicable, a physical channel and an RS may be transmitted by beamforming. When beamforming-based signal transmission is supported, beam management may be performed for beam alignment between a BS and a UE. Further, a signal proposed in various embodiments of the present disclosure may be transmitted/received by beamforming. In RRC_IDLE mode, beam alignment may be performed based on a synchronization signal block (SSB or SS/PBCH block), whereas in RRC_CONNECTED mode, beam alignment may be performed based on a CSI-RS (in DL) and an SRS (in UL). On the contrary, when beamforming-based signal transmission is not supported, beam-related operations may be omitted in the following description.

Referring to FIG. 19, a BS (e.g., eNB) may periodically transmit an SSB (2702). The SSB includes a PSS/SSS/PBCH. The SSB may be transmitted by beam sweeping. The BS may then transmit remaining minimum system information (RMSI) and other system information (OSI) (2704). The RMSI may include information required for the UE to perform initial access to the BS (e.g., PRACH configuration information). After detecting SSBs, the UE identifies the best SSB. The UE may then transmit an RACH preamble (Message 1; Msg1) in PRACH resources linked/corresponding to the index (i.e., beam) of the best SSB (2706). The beam direction of the RACH preamble is associated with the PRACH resources. Association between PRACH resources (and/or RACH preambles) and SSBs (SSB indexes) may be configured by system information (e.g., RMSI). Subsequently, in an RACH procedure, the BS may transmit a random access response (RAR) (Msg2) in response to the RACH preamble (2708), the UE may transmit Msg3 (e.g., RRC Connection Request) based on a UL grant included in the RAR (2710), and the BS may transmit a contention resolution message (Msg4) (2712). Msg4 may include RRC Connection Setup.

When an RRC connection is established between the BS and the UE in the RACH procedure, beam alignment may subsequently be performed based on an SSB/CSI-RS (in DL) and an SRS (in UL). For example, the UE may receive an SSB/CSI-RS (2714). The SSB/CSI-RS may be used for the UE to generate a beam/CSI report. The BS may request the UE to transmit a beam/CSI report, by DCI (2716). In this case, the UE may generate a beam/CSI report based on the SSB/CSI-RS and transmit the generated beam/CSI report to the BS on a PUSCH/PUCCH (2718). The beam/CSI report may include a beam measurement result, information about a preferred beam, and so on. The BS and the UE may switch beams based on the beam/CSI report (2720a and 2720b).

Subsequently, the UE and the BS may perform the above-described/proposed procedures and/or methods. For example, the UE and the BS may transmit a wireless signal by processing information stored in a memory or may process received wireless signal and store the processed signal in the memory according to various embodiments of the present disclosure, based on configuration information obtained in the network access process (e.g., the system information acquisition process, the RRC connection process through an RACH, and so on). The wireless signal may include at least one of a PDCCH, a PDSCH, or an RS on DL and at least one of a PUCCH, a PUSCH, or an SRS on UL.

According to various embodiments of the present disclosure, the RS may be the PRS, and information transmitted on UL may be additional UE location information, which is obtained by sensors mounted on the UE.

The various embodiments of the present disclosure may not be necessarily performed after 2720a and/or 2720b. For example, when an RRC connection is established between the UE and BS after 2712, the various embodiments of the present disclosure may be performed without or with the processes after 2714.

The above-described initial access procedure may be combined with the embodiments described above in Section 1 to 3 to implement other various embodiments of the present disclosure, which will be clearly understood by those of ordinary skill in the art.

Figure 20:
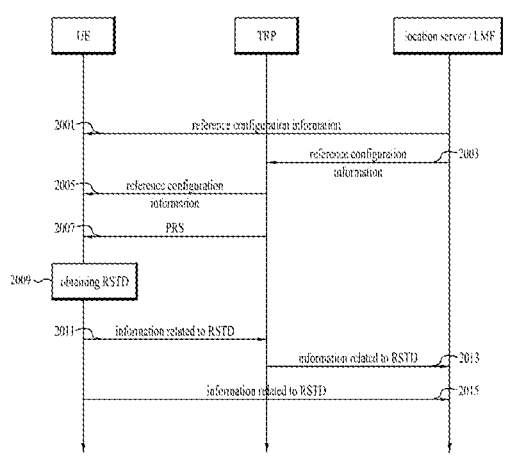
FIG. 20 is a diagram schematically illustrating an operation method for a UE and network nodes according to various embodiments of the present disclosure.

FIG. 20 is a diagram schematically illustrating an operation method for a UE and network nodes according to various embodiments of the present disclosure.

Referring to FIG. 20, in operation 2001 according to an exemplary embodiment, a location server and/or LMF may transmit reference configuration information related to a reference timing to the UE, and the UE may receive the reference configuration information.

In operation 2003 according to an exemplary embodiment, the location server and/or LMF may transmit the reference configuration information related to the reference timing to a TRP, and the TRP may receive the reference configuration information. In operation 2005 according to an exemplary embodiment, the TRP may forward the reference configuration information related to the reference timing to the UE, and the UE may receive the reference configuration information. In this case, operation 2001 according to the exemplary embodiment may be omitted.

On the contrary, operations 2003 and 2005 according to the exemplary embodiments may be omitted. In this case, operation 2001 according to the exemplary embodiment may be performed.

That is, operation 2001 according to the exemplary embodiment and operations 2003 and 2005 according to the exemplary embodiments may be alternate.

In operation 2007 according to an exemplary embodiment, the TRP may transmit a PRS to the UE, and the UE may receive the PRS. For example, the UE may receive a plurality of PRSs transmitted from a plurality of TRPs.

In operation 2009 according to an exemplary embodiment, the UE may obtain an RSTD based on the reference timing and at least one PRS among the plurality of PRSs.

In operation 2011 according to an exemplary embodiment, the UE may transmit information related to the RSTD to the TRP, and the TRP may receive the information. In operation 2013 according to an exemplary embodiment, the TRP may forward the information related to the RSTD to the location server and/or LMF, and the location server and/or LMF may receive the information.

In operation 2015 according to an exemplary embodiment, the UE may transmit the information related to the RSTD to the location server and/or LMF, and the location server and/or LMF may receive the information. In this case, operations 2011 and 2013 according to the exemplary embodiments may be omitted.

On the contrary, operation 2015 according to the exemplary embodiment may be omitted. In this case, operations 2011 and 2013 according to the exemplary embodiments may be performed.

That is, operations 2011 and 2013 according to the exemplary embodiments and operation 2015 according to the exemplary embodiment may be alternate.

According to an exemplary embodiment, the reference configuration information may include at least one of information on a reference TRP among the plurality of TRPs (for RSTD acquisition), information on a reference PRS resource, or information on a PRS resource set including the reference PRS resource.

Figure 21:
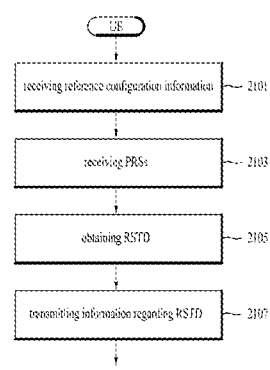
FIG. 21 is a flowchart illustrating an operation method for a UE according to various embodiments of the present disclosure.

FIG. 21 is a flowchart illustrating an operation method for a UE according to various embodiments of the present disclosure.

Referring to FIG. 21, in operation 2101 according to an exemplary embodiment, the UE may receive reference configuration information related to a reference timing.

In operation 2103 according to an exemplary embodiment, the UE may receive a plurality of PRSs. For example, the UE may receive the plurality of PRSs from a plurality of TRPs.

In operation 2105 according to an exemplary embodiment, the UE may obtain an RSTD based on the reference timing and at least one PRS among the plurality of PRSs.

In operation 2107 according to an exemplary embodiment, the UE may transmit information related to the RSTD.

According to an exemplary embodiment, the reference configuration information may include at least one of information on a reference PRS resource (for RSTD acquisition) or information on a PRS resource set including the reference PRS resource.

Figure 22:
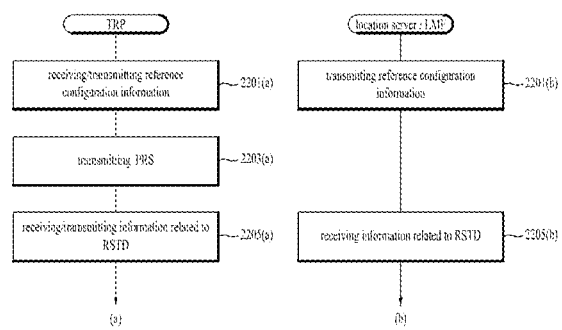
FIG. 22 is a flowchart illustrating an operation method for network nodes according to various embodiments of the present disclosure.

FIG. 22 is a flowchart illustrating an operation method for network nodes according to various embodiments of the present disclosure.

Referring to FIG. 22(*a*), in operation 2201(*a*) according to an exemplary embodiment, a TRP may receive reference configuration information related to a reference timing from a location server and/or LMF and forward the reference configuration information to a UE.

In operation 2203(*a*) according to an exemplary embodiment, the TRP may transmit a PRS.

In operation 2205(*a*) according to an exemplary embodiment, the TRP may receive information related to an RSTD and may forward the information to the location server and/or LMF.

Referring to FIG. 22(*b*), in operation 2201(*b*) according to an exemplary embodiment, a location server and/or LMF may transmit reference configuration information.

In operation 2205(*b*) according to an exemplary embodiment, the location server and/or LMF may receive information related to an RSTD.

According to an exemplary embodiment, the reference configuration information may include at least one of information on a reference TRP among a plurality of TRPs (for RSTD acquisition), information on a reference PRS resource, or information on a PRS resource set including the reference PRS resource.

The operations of the UE and/or network nodes according to various embodiments of the present disclosure may be explained and performed based on the details described in Sections 1 to 3.

It is obvious that each of the examples of the proposed methods may also be included as one of various embodiments of the present disclosure, and thus each example may be regarded as a kind of proposed method. Although the proposed methods may be implemented independently, some of the proposed methods may be combined (or merged) and implemented. In addition, it may be regulated that information on whether the proposed methods are applied (or information on rules related to the proposed methods) are transmitted from the BS to the UE through a predefined signal (e.g., a physical layer signal, a higher layer signal, etc.).

4. EXEMPLARY CONFIGURATIONS OF DEVICES IMPLEMENTING VARIOUS EMBODIMENTS OF THE PRESENT DISCLOSURE 4.1. Exemplary Configurations of Devices to which Various Embodiments of the Present Disclosure are Applied FIG. 23 is a diagram illustrating devices that implement various embodiments of the present disclosure.

Figure 23:
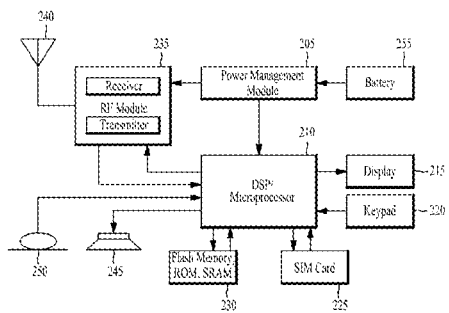
FIG. 23 is a block diagram illustrating an apparatus for implementing various embodiments of the present disclosure.

The devices illustrated in FIG. 23 may be a UE and/or a BS (e.g., eNB or gNB) adapted to perform the aforedescribed mechanisms, or any devices performing the same operation.

Referring to FIG. 23, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 23 may illustrate a UE including a receiver 235 configured to receive a request message from a network and a transmitter 235 configured to transmit timing transmission/reception timing information to the network.

These receiver and transmitter may form the transceiver 235. The UE may further include a processor 210 coupled to the transceiver 235.

Further, FIG. 23 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor included in a UE (or a communication device included in the UE) and a BS (or a communication device included in the BS) according to various embodiments of the present disclosure may operate as follows, while controlling a memory.

According to various embodiments of the present disclosure, a UE or a BS may include at least one transceiver, at least one memory, and at least one processor coupled to the at least one transceiver and the at least one memory. The at least one memory may store instructions causing the at least one processor to perform the following operations.

A communication device included in the UE or the BS may be configured to include the at least one processor and the at least one memory. The communication device may be configured to include the at least one transceiver, or may be configured not to include the at least one transceiver but to be connected to the at least one transceiver.

According to various embodiments of the present disclosure, one or more processors included in the UE (or one or more processors of the communication device included in the UE) may be configured to receive reference configuration information related to a reference timing.

According to various embodiments of the present disclosure, the one or more processors included in the UE may be configured to receive a plurality of PRSs.

According to various embodiments of the present disclosure, the one or more processors included in the UE may be configured to obtain one or more RSTDs based on the reference timing and at least one PRS among the plurality of PRSs.

According to various embodiments of the present disclosure, the one or more processors included in the UE may be configured to transmit information related to the one or more RSTDs.

In an example embodiment, the plurality of PRSs may be received from a plurality of TRPs.

In an exemplary embodiment, the reference configuration information may include at least one of information on a reference PRS resource (for RSTD acquisition) or information on a PRS resource set including the reference PRS resource.

A more specific operation of a processor included in a BS and/or a UE according to various embodiments of the present disclosure may be described and performed based on the afore-described clause 1 to clause 3.

Unless contradicting with each other, various embodiments of the present disclosure may be implemented in combination. For example, the BS and/or the UE according to various embodiments of the present disclosure may perform operations in combination of the embodiments of the afore-described clause 1 to clause 3, unless contradicting with each other.

4.2. Example of Communication System to which Various Embodiments of the Present Disclosure are Applied In the present specification, various embodiments of the present disclosure have been mainly described in relation to data transmission and reception between a BS and a UE in a wireless communication system. However, various embodiments of the present disclosure are not limited thereto. For example, various embodiments of the present disclosure may also relate to the following technical configurations.

The various descriptions, functions, procedures, proposals, methods, and/or operational flowcharts of the various embodiments of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 24:
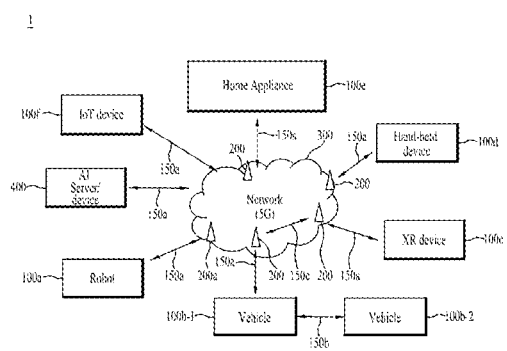
FIG. 24 is a diagram illustrating a communication system to which various embodiments of the present disclosure are applicable.

FIG. 24 illustrates an exemplary communication system to which various embodiments of the present disclosure are applied.

Referring to FIG. 24, a communication system 1 applied to the various embodiments of the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments of the present disclosure.

Figure 25:
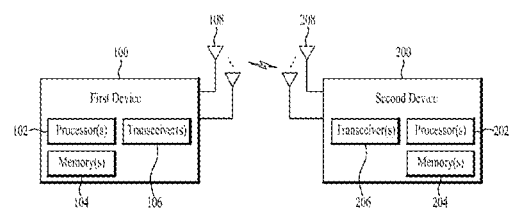
FIG. 25 is a block diagram illustrating wireless devices to which various embodiments of the present disclosure are applicable.

4.2.1 Example of Wireless Devices to which Various Embodiments of the Present Disclosure are Applied FIG. 25 illustrates exemplary wireless devices to which various embodiments of the present disclosure are applicable.

Referring to FIG. 25, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. W1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments of the present disclosure, one or more memories (e.g., 104 or 204) may store instructions or programs which, when executed, cause one or more processors operably coupled to the one or more memories to perform operations according to various embodiments or implementations of the present disclosure.

According to various embodiments of the present disclosure, a computer-readable storage medium may store one or more instructions or computer programs which, when executed by one or more processors, cause the one or more processors to perform operations according to various embodiments or implementations of the present disclosure.

According to various embodiments of the present disclosure, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

Figure 26:
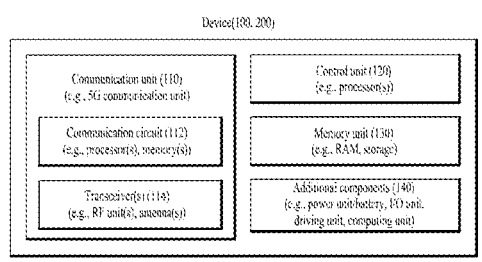
FIG. 26 is a block diagram illustrating another example of wireless devices to which various embodiments of the present disclosure are applicable.

4.2.2. Example of Using Wireless Devices to which Various Embodiments of the Present Disclosure are Applied FIG. 26 illustrates other exemplary wireless devices to which various embodiments of the present disclosure are applied. The wireless devices may be implemented in various forms according to a use case/service (see FIG. 24).

Referring to FIG. 26, wireless devices 100 and 200 may correspond to the wireless devices 100 and 200 of FIG. 24 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 24. For example, the transceiver(s) 114 may include the one or more transceivers 106 and 206 and/or the one or more antennas 108 and 208 of FIG. 24. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. W1), the vehicles (100b-1 and 100b-2 of FIG. W1), the XR device (100c of FIG. W1), the hand-held device (100d of FIG. W1), the home appliance (100e of FIG. W1), the IoT device (100f of FIG. W1), a digital broadcast terminal, a hologram device, a public safety device, an MTC device, a medicine device, a fintech device (or a finance device), a security device, a climate/environment device, the AI server/device (400 of FIG. W1), the BSs (200 of FIG. W1), a network node, etc. The wireless device may be used in a mobile or fixed place according to a use-example/service.

In FIG. 26, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 26 will be described in detail with reference to the drawings.

Figure 27:
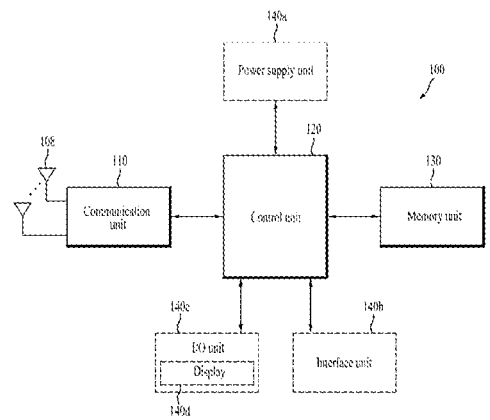
FIG. 27 is a block diagram illustrating a portable device applied to various embodiments of the present disclosure.
Figure 28:
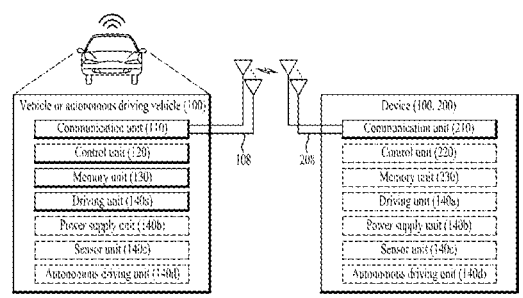
FIG. 28 is a block diagram illustrating a vehicle or an autonomous driving vehicle, which is applied to various embodiments of the present disclosure.

4.2.3. Example of Portable Device to which Various Embodiments of the Present Disclosure are Applied FIG. 27 illustrates an exemplary portable device to which various embodiments of the present disclosure are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 27, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. X3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

4.2.4. Example of Vehicle or Autonomous Driving Vehicle to which Various Embodiments of the Present Disclosure are Applied FIG. 39 illustrates an exemplary vehicle or autonomous driving vehicle to which various embodiments of the present disclosure. The vehicle or autonomous driving vehicle may be implemented as a mobile robot, a car, a train, a manned/unmanned aerial vehicle (AV), a ship, or the like.

Referring to FIG. 39, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. X3, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 29:
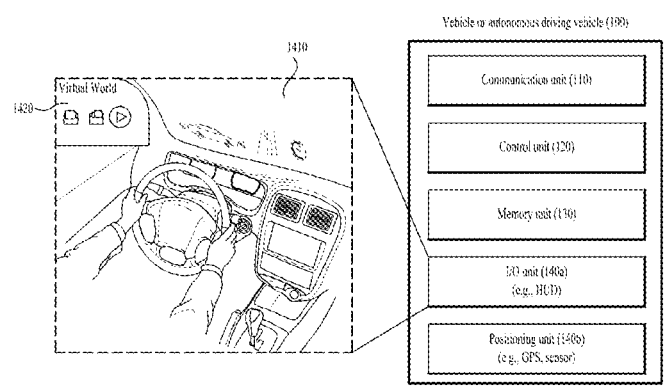
FIG. 29 is a block diagram illustrating a vehicle applied to various embodiments of the present disclosure.

4.2.5. Example of AR/VR and Vehicle to which Various Embodiments of the Present Disclosure are Applied FIG. 29 illustrates an exemplary vehicle to which various embodiments of the present disclosure are applied. The vehicle may be implemented as a transportation means, a train, an aircraft, a ship, or the like.

Referring to FIG. 29, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 26.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

In summary, various embodiments of the present disclosure may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi-mode multi-band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

Various embodiments of the present disclosure may be implemented in various means. For example, various embodiments of the present disclosure may be implemented in hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments of the present disclosure may be carried out in other specific ways than those set forth herein without departing from the spirit and essential characteristics of the various embodiments of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

The various embodiments of present disclosure are applicable to various wireless access systems including a 3GPP system, and/or a 3GPP2 system. Besides these wireless access systems, the various embodiments of the present disclosure are applicable to all technical fields in which the wireless access systems find their applications. Moreover, the proposed method can also be applied to mmWave communication using an ultra-high frequency band.

The invention claimed is:

1. A method performed by a user equipment (UE), the method comprising:
receiving positioning reference signal (PRS) configuration information;
determining, by the UE, a reference for a reference signal time difference (RSTD) measurement;
performing the RSTD measurement based on the reference determined by the UE; and
transmitting, to a network, a measurement report including a measured value for the RSTD measurement,
wherein the measurement report is configured to report to the network i) which PRS resource has been determined by the UE as the reference, along with ii) the measured value,
wherein a PRS resource determined by the UE as the reference is not indicated by the network as a reference PRS resource, and
wherein the RSTD measurement is performed with respect to a plurality of transmission points (TPs).

2. The method of claim 1, wherein the reference determined by the UE is related to a transmission point (TP).

3. The method of claim 1, further comprising: receiving information regarding whether the UE is allowed to determine the reference for the RSTD measurement.

4. The method of claim 1, wherein the reference is determined by the UE based on a quality of: a time of arrival (ToA) or a propagation time.

5. The method of claim 1, wherein the configuration information further comprises information regarding a reference TP among the plurality of TPs.

6. A user equipment (UE) comprising:
a transceiver; and
at least one processor coupled with the transceiver, wherein the at least one processor is configured to:
receive positioning reference signal (PRS) configuration information;
determine a reference for a reference signal time difference (RSTD) measurement;
perform the RSTD measurement based on the reference determined by the UE; and
transmitting, to a network, a measurement report including a value for the RSTD measurement,
wherein the measurement report is configured to report to the network i) which PRS resource has been determined by the UE as the reference, along with ii) the measured value,
wherein a PRS resource determined by the UE as the reference is not indicated by the network as a reference PRS resource, and
wherein the RSTD measurement is performed with respect to a plurality of transmission points (TPs).

7. A method performed by a base station, the method comprising:
transmitting, to a user equipment (UE), positioning reference signal (PRS) configuration information; and
receiving, from the UE, a measurement report including a value of a reference signal time difference (RSTD) measurement performed by the UE,
wherein the measurement report is configured to report i) which PRS resource has been determined by the UE as a reference for the RSTD measurement, along with ii) the value of the RSTD measurement,
wherein a PRS resource determined by the UE as the reference is not indicated by the base station as a reference PRS resource, and
wherein the RSTD measurement is performed with respect to a plurality of transmission points (TPs).

8. A base station comprising:
a transceiver; and
at least one processor coupled with the transceiver, wherein the at least one processor is configured to:
transmit, to a user equipment (UE), positioning reference signal (PRS) configuration information; and
receive, from the UE, a measurement report including a value of a reference signal time difference (RSTD) measurement performed by the UE,
wherein the measurement report is configured to report i) which PRS resource has been determined by the UE as a reference for the RSTD measurement, along with ii) the value of the RSTD measurement,
wherein a PRS resource determined by the UE as the reference is not indicated by the base station as a reference PRS resource, and
wherein the RSTD measurement is performed with respect to a plurality of transmission points (TPs).

* * * * *